(12) United States Patent
Benedict et al.

(10) Patent No.: US 8,206,074 B2
(45) Date of Patent: Jun. 26, 2012

(54) PORT STORAGE AND DISTRIBUTION SYSTEM FOR INTERNATIONAL SHIPPING CONTAINERS

(75) Inventors: Charles E. Benedict, Tallahassee, FL (US); Brian G. Pfeifer, Tallahassee, FL (US); James R. Dobbs, Tallahassee, FL (US); Scott K. Bladen, Bristol, FL (US); Christian A. Yates, Tallahassee, FL (US); Richard E. Lackinger, Tallahassee, FL (US)

(73) Assignee: BEC Companies, Inc., Tallahassee, FL (US)

( * ) Notice: Subject to any disclaimer, the term of this patent is extended or adjusted under 35 U.S.C. 154(b) by 0 days.

(21) Appl. No.: 12/833,324

(22) Filed: Jul. 9, 2010

(65) Prior Publication Data

US 2011/0027059 A1 Feb. 3, 2011

Related U.S. Application Data

(63) Continuation of application No. 11/681,083, filed on Mar. 1, 2007, now Pat. No. 7,753,637.

(51) Int. Cl.
*B63B 27/00* (2006.01)
*B65G 67/60* (2006.01)

(52) U.S. Cl. ................... 414/140.3; 414/141.3

(58) Field of Classification Search ............ 104/106, 104/48, 89, 91, 96; 114/72, 75; 212/307; 378/57; 414/137.5, 139.6, 140.4, 141.5, 414/142.6, 143.2, 239, 307, 458, 459, 460, 461, 560, 561, 667, 785, 788.2, 792.9; 701/23
See application file for complete search history.

(56) References Cited

U.S. PATENT DOCUMENTS

| | | | |
|---|---|---|---|
| 5,190,427 A * | 3/1993 | Lai | 414/278 |
| 5,754,617 A * | 5/1998 | Itoh | 378/4 |
| 7,708,514 B2 * | 5/2010 | Benedict et al. | 414/142.6 |
| 7,850,412 B2 * | 12/2010 | Benedict et al. | 414/281 |
| 7,909,558 B2 * | 3/2011 | Benedict et al. | 414/234 |
| 2008/0075566 A1 * | 3/2008 | Benedict et al. | 414/228 |
| 2008/0075568 A1 * | 3/2008 | Benedict et al. | 414/267 |
| 2008/0075569 A1 * | 3/2008 | Benedict et al. | 414/269 |
| 2008/0213073 A1 * | 9/2008 | Benedict et al. | 414/279 |
| 2011/0027059 A1 * | 2/2011 | Benedict et al. | 414/803 |

FOREIGN PATENT DOCUMENTS

| | | | | |
|---|---|---|---|---|
| JP | 08120938 A | * | 5/1996 | |
| JP | 2005255362 A | * | 9/2005 | |

* cited by examiner

*Primary Examiner* — Gregory Adams
(74) *Attorney, Agent, or Firm* — Dowell & Dowell, P.C.

(57) ABSTRACT

A port storage and distribution system for facilitating the transfer and/or storage of international shipping containers between container ships and ground transport carriers wherein an overhead grid guide track structure is provide that permits overhead transfer units to selectively engage and convey containers as required between the various ships, carriers and storage area without requiring multiple transfers of containers between different handling equipment. The system provides for container scanning and is either fully automated or partially manually controlled.

16 Claims, 21 Drawing Sheets

PORT STORAGE AND DISTRIBUTION SYSTEM FOR INTERNATIONAL SHIPPING CONTAINERS

BACKGROUND OF INVENTION

1. Field of Invention

This application is directed to a container port storage and distribution system wherein shipping containers are manipulated by one or more overhead transfer units (TU) that can lift or elevate the shipping containers and maneuver them into vertical columns or stacks that are end to end and side by side, without the need to use conventional cranes, forklifts, straddle carriers, and the like, and in such a manner as to maximize storage space by eliminating the need for aisles or spaces between rows of shipping containers for manipulating and/or handling equipment. In one embodiment the system includes a means for transferring the shipping containers directly from the container ships to the storage area and from a storage area to/from an intermodal transport area including rail cars, as well as delivery vehicles such as tractor trailers.

2. Brief Description of the Related Art

The most efficient and economical manner of shipping goods by ship, rail or truck is the through the use of standardized international shipping or cargo containers. The containers are designated in standard sizes which are generally twenty, forty or forty-five feet in length. The containers are specifically designed so that they may be loaded into the holds and on the decks of ocean going vessels and off loaded from the vessels at a port by use of either on-board or on-shore cranes which are used to place the containers on dock areas where they are moved by one or more transport devices such as large fork lifts, straddle carrier, automatic guided vehicles (AGV's) and the like. In some instances the containers may be loaded onto land transport vehicles including railway cars and trucks and in other instances the containers may be moved into storage such as in a warehouse.

Loading/unloading shipping containers to/from container ships is a labor intensive and time consuming process. It requires large gantry cranes on a ship or shore to lift and transfer the shipping containers to/from the container ships to an area where straddle carriers, or other transporters, move the containers directly to a storage area or to another transfer location, where a type of bridge crane transfers the shipping containers to a storage area where the shipping containers are stacked generally three or four high in a side by side, end to end arrangement within the length and width of a bridge crane footprint. Straddle carriers typically stack the shipping containers two to three high and require an aisle between each row of containers for the carriers to maneuver. Gantry cranes are also used to lift and transport shipping containers using a spreader beam much like straddle carriers, ships and gantry cranes and the like. They are used primarily to transfer the shipping containers from a staging yard to rail cars or overland truck/trailers.

Selective storage and retrieval of shipping containers within various storage areas is very time consuming and becomes a bottleneck to an efficient movement of containers into and out of the storage areas both for transfer to/from the container ships, as well as to/from rail cars and truck/trailers. The land area required for current container ports is extremely large. Currently operating container ports are increasingly unable to handle the volumes of containers arriving and leaving the ports as more and larger container ships are being utilized.

In view of the foregoing, port authorities must find larger land areas with more docking space to facilitate the growth in the numbers of shipping containers arriving and leaving ports. Environmental pressures are also increasing on the port authorities for more efficient land use, which drives up the cost of constructing and/or expanding the ports.

In an attempt to mitigate bottlenecks within most container ports, port authorities have initiated improvements, such as in Singapore and Rotterdam, by automation of container movement. However, multiple transfers between ships and transport vehicles are still required, which creates time consuming bottlenecks. However, even with such improvements, the flow of containers through container ports is fragmented and disjointed due to limited land area, multiple transfers of containers from the ships to the final transportation vehicles, vehicle congestion and limited mooring space.

In addition to the foregoing, there is virtually no x-ray or other screening of shipping containers as they enter the ports for both inbound and outbound cargo. This leaves containers, and thus ports, ships and other transportation vehicles vulnerable to terrorist attacks and other threats. In view of the foregoing, there is a need to further improve upon the manner in which shipping containers are handled and/or stored within port facilities and shipping terminals as well as to provide greater or increased security by providing for container inspection.

SUMMARY OF THE INVENTION

The present invention is directed to a shipping container port facility that maximizes storage space and increases the efficiency of selective storage and retrieval of shipping containers within the facility. In one embodiment, shipping containers are transferred to an elevated transfer platform positioned between container ships and on shore transportation terminals or storage or warehouse areas using currently available gantry type cranes. From the elevated platform, the shipping containers are transferred using overhead transfer units or vehicles directly to selectively stored in warehouses or other storage areas from which the containers are retrieved for transfer directly to/from rail cars or overland semi-tractor trailers, thereby eliminating the requirement for transfer of storage using other load/unload equipment, such as required by current port operations.

In another embodiment of the invention, shipping containers are transferred directly to/from container ships using overhead container transfer vehicles or units that move along an intersecting grid guide track structure that extends between the ships and storage areas such as warehouses and transport vehicles such as rail cars and trucks without the need for secondary container handling equipment such as cranes, straddle carriers, forklifts and the like.

The container port storage and retrieval system stores and retrieves the shipping containers using one or more overhead container transfer vehicles or units (TUs). The overhead TUs lift the shipping containers and maneuver them into vertical stacks in an end to end and side by side configuration, without the need to use conventional bridge cranes, forklifts, straddle carriers or the like and in such a manner as to eliminate transfers of the containers from one carrier to another and to maximize storage space by eliminating the need for internal aisles (and transfer areas) for manipulating and/or handling equipment. Thus, the container port shipping container selective storage and retrieval system stores and retrieves individual shipping containers within an X-Y-Z storage matrix, where X is the end to end direction, Y is the side by side direction and Z is the top to bottom or vertical direction.

The container port storage and retrieval system also provides for the electronic scanning of shipping containers, such as by X-rays, wherein the scanning equipment is positioned such that the containers are scanned as they are suspended from the transfer units moving along the grid guide track structure. In preferred embodiments, the scanners are placed at elevated areas beneath the overhead grid guide track structure and are placed to ensure the containers are scanned before being placed into storage and before being transferred to another type of transport vehicle. In this manner, the safety and security of the port facility is maximized.

The system of the invention also provides for automated tracking of containers and transfer units so that the location and destination of the containers and transfer units is always known. Bar codes and/or RFID tags may be placed on the containers which codes or tags may be remotely read by the transfer units and relayed to a warehouse inventory system. The codes or tags include information regarding the contents of the containers, manufactures, shippers, destinations and other information that may be required by a port authority and government regulatory agencies. In some embodiments, the transfer units will be remotely controlled and thus include transceivers for communicating with a central control system of the port, and in some instances, the transfer units may be remotely controlled either using radio frequency technology, Global Positioning Technology (GPS) and the like. The invention also provides for at least partial manual control of the transfer units by providing an operator console on a transfer unit that includes controls for the RFID bar code scanning equipment, motors and winches or other drive components associated therewith.

It is a primary object of the present invention to maximize storage space and increases the efficiency of selective container storage and retrieval within port storage and transportation systems or facilities.

It is another object of the invention to provide a material handling system for use on and with container ships which facilitates the efficient maneuvering, loading and off-loading of standardized international type shipping containers wherein a plurality of overhead transfer units move the containers simultaneously along an elevated grid guide track structure so that a plurality of containers may be moved simultaneously without interfering with one another and without the need to transfer the containers to other container handling equipment to effective unload, transfer, position or load the containers within the port system. In addition to replacing the conventional manner of transferring containers between multiple handling equipment such as cranes, straddle carrier forklifts and the like, the system of the invention further minimizing transfer times by effectively eliminating or reducing the vertical travel path of the container between a point of off loading to a point of storage or loading.

It is also an object of the present invention to provide a material handling, retrieval and storage system for standardized international shipping containers which enables specific containers to be retrieved from any level of a multi-tiered cell structure of a hold, warehouse or storage area.

It is another object of the invention to enhance port security and safety by screening shipping container before they are transferred from incoming ships and transport carriers to either storage or staging sites or to other carriers as well as before they are transferred from other carriers into the storage or staging sites or directly onto the container ships.

BRIEF DESCRIPTION OF THE DRAWINGS

A better understanding of the invention will be had with reference to the attached drawings wherein.

DESCRIPTION OF PREFERRED EMBODIMENTS

With continued reference to the drawings, improved port facilities will be described wherein the off-loading, loading and handling of shipping containers is facilitated so as to reduce the amount of equipment, space and man power necessary to efficiently conduct port operations. Several embodiments of the invention will be described.

Figure 1:
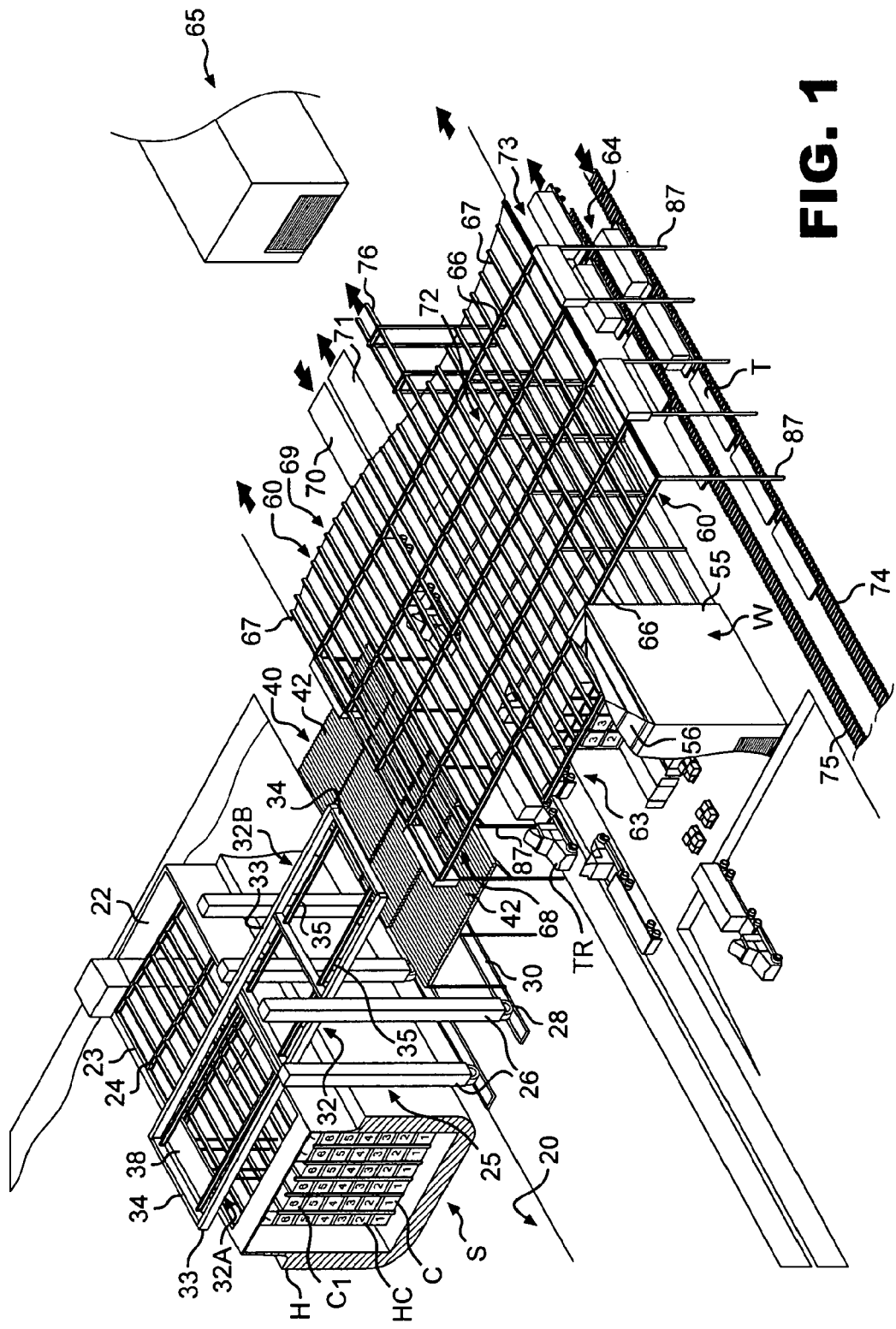
FIGS. 1-4 are perspective views of a first embodiment of a shipping container port storage and transportation system in accordance with the teachings of the present invention, illustrating the transfer of a shipping container from a container ship to an elevated transfer platform on which the container is placed so as to be subsequently engaged by an overhead transfer vehicle or unit to be moved within the system to either be stored or placed on a ground carrier for transport.

A first embodiment of port facility is shown in FIG. 1 as including a docking berth area 20 for a container ship "S". A container ship is a specialized vessel which is specifically designed to maximize the storage capacity of international storage and shipping containers "C". Conventional container ships "S" include one or more hold areas extending from a bow to a stern of the ship with each hold area being divided into a plurality of vertically tiered cells. Only a section through the hull "H" of the ship "S" is shown in FIG. 1 in which a plurality of vertical holding cells "HC" are formed. The cells are open vertically and are defined by generally V-shaped steel guide posts which are positioned at the four corners of each cell. The steel guide posts are spaced in such a manner that conventionally dimensioned international shipping containers "C" may be positively guided when being lowered into or being raised within the cells. In this manner the containers may be stacked one upon another within each cell. Typical cells may retain as many as six or more stacked containers.

Each hold 22 is shown as being reinforced by a plurality of fore and aft extending steel beams 23 and starboard to port extending beams 24 each of which is constructed to coincide with the cells "HC". This grid structure is sealed utilizing conventional hatch covers, not shown, which are removably mounted in a conventional manner to the structure. As further shown in FIG. 1, there are seven storage tiers 1 through 7 in each cell of the hold area and, further, there are shown, seven cells in width between the starboard and port side of the ship's hull with only six being visible in the drawing figure.

The system of the present invention allows the first six tier levels to be completely filled with storage containers "C" as is illustrated in FIG. 1, however, approximately half of the seventh tier "7" of each of the cells are left vacant or empty upon the initial loading of the vessel in order to allow for storage containers "C" to be shuffled within the cells of the vessel. Utilizing the invention, a container located on the sixth tier may be elevated and placed in the seventh tier of one of the cells and, in like manner, the underlying container in the fifth tier may also be raised and placed in an empty seventh tier of another cell. In this manner, access can be obtained to any of the containers within a cell without requiring that the containers be elevated out of the hold area of the ship.

Once a desired container such as shown at $C_1$ in FIG. 1 is exposed, the container may be elevated and discharged from the ship by use of a gantry crane 25 that is disposed along the dock so as to be movable relative to the ship's hold. As opposed to using a shore based gantry crane, in some instances it may be possible to use one or more conventional ship's cranes utilizing conventional hoist line equipment, not shown, to elevate containers from the storage cells and move them toward the on shore handling equipment of the present invention.

Figure 4:
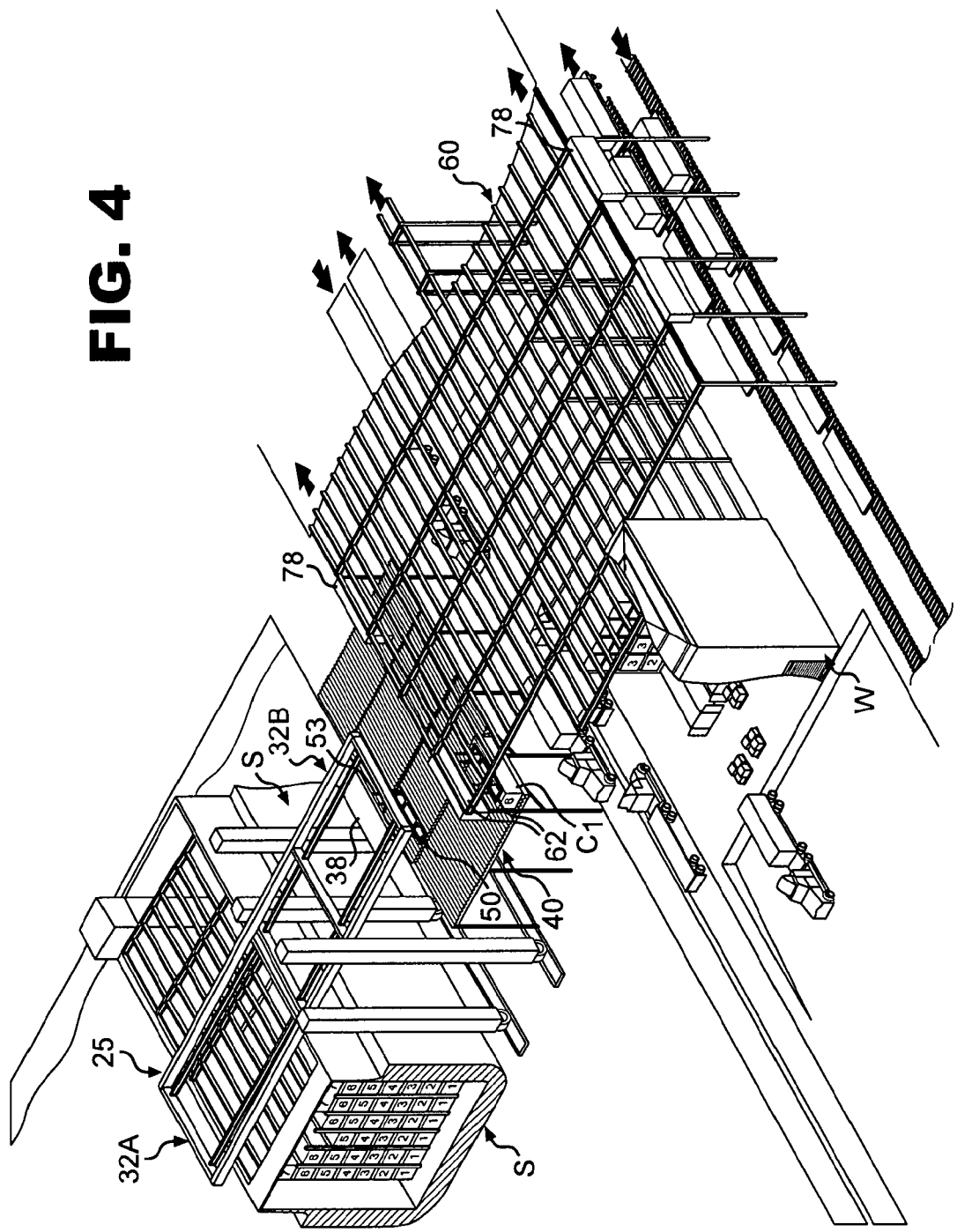
Figure 5:
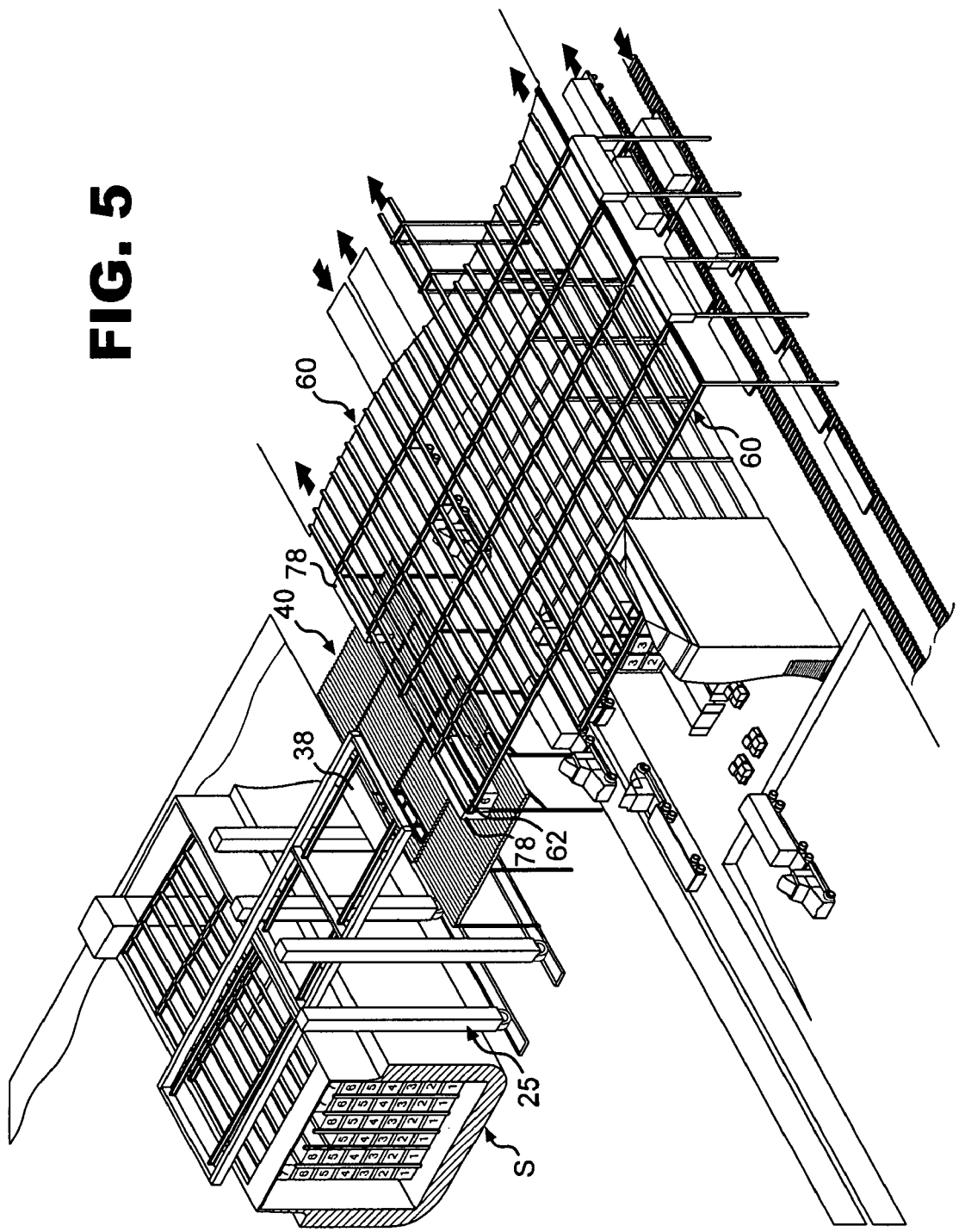
FIG. 5 is a perspective view similar to FIGS. 1-4 illustrating the shipping container being elevated from the elevated platform by a transfer vehicle or unit to an adjacent scanner for inspecting the contents of the container prior to the container being transferred to storage or placed on a transport vehicle such as a truck or train.
Figure 6:
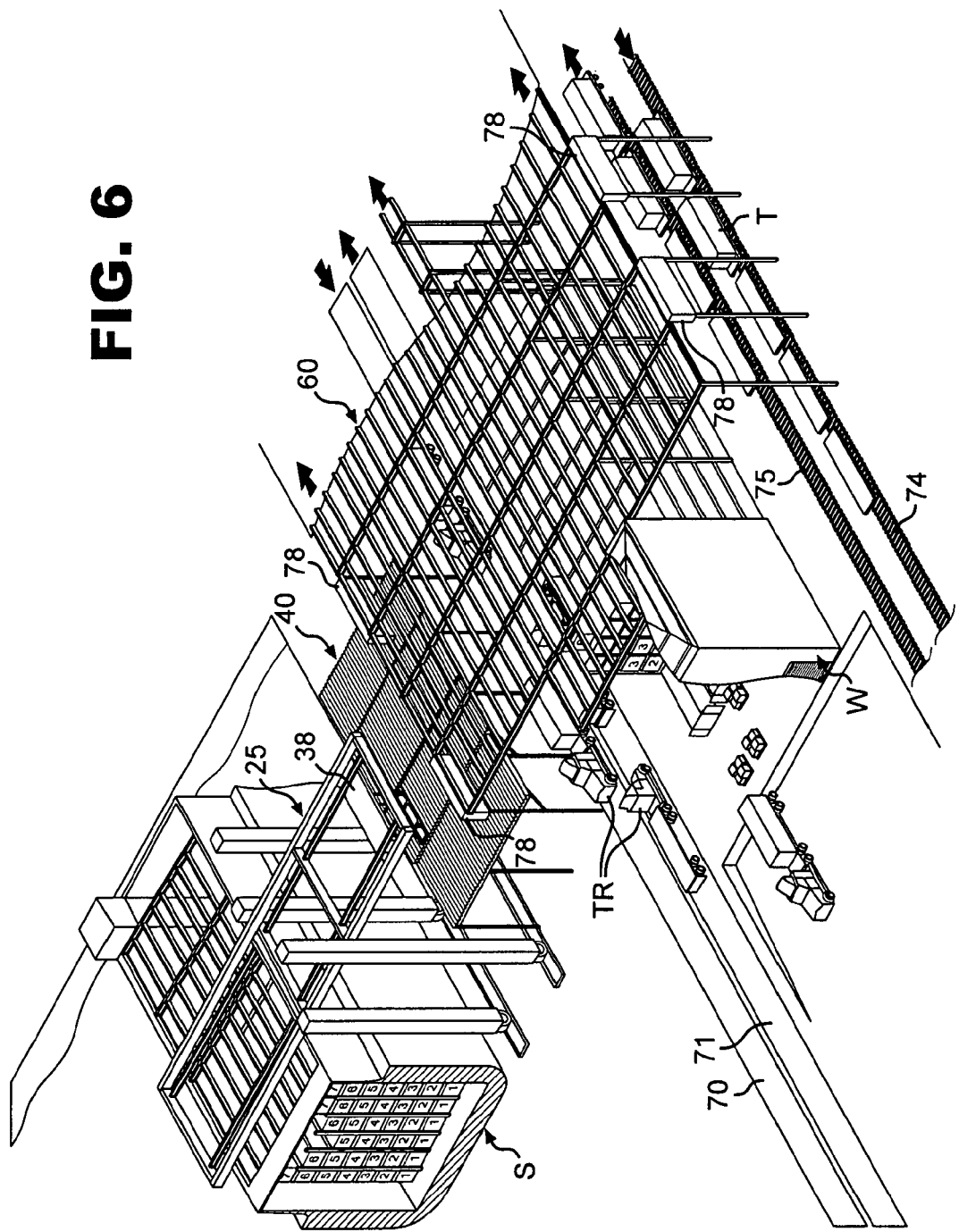
FIG. 6 is a perspective view similar to FIGS. 1-4 illustrating a shipping container being elevated from a storage cell or stack of containers within the storage system by one of the transfer vehicles or units as the container is being transferred to a transport vehicle such as a truck, train or the container ship.
Figure 7:
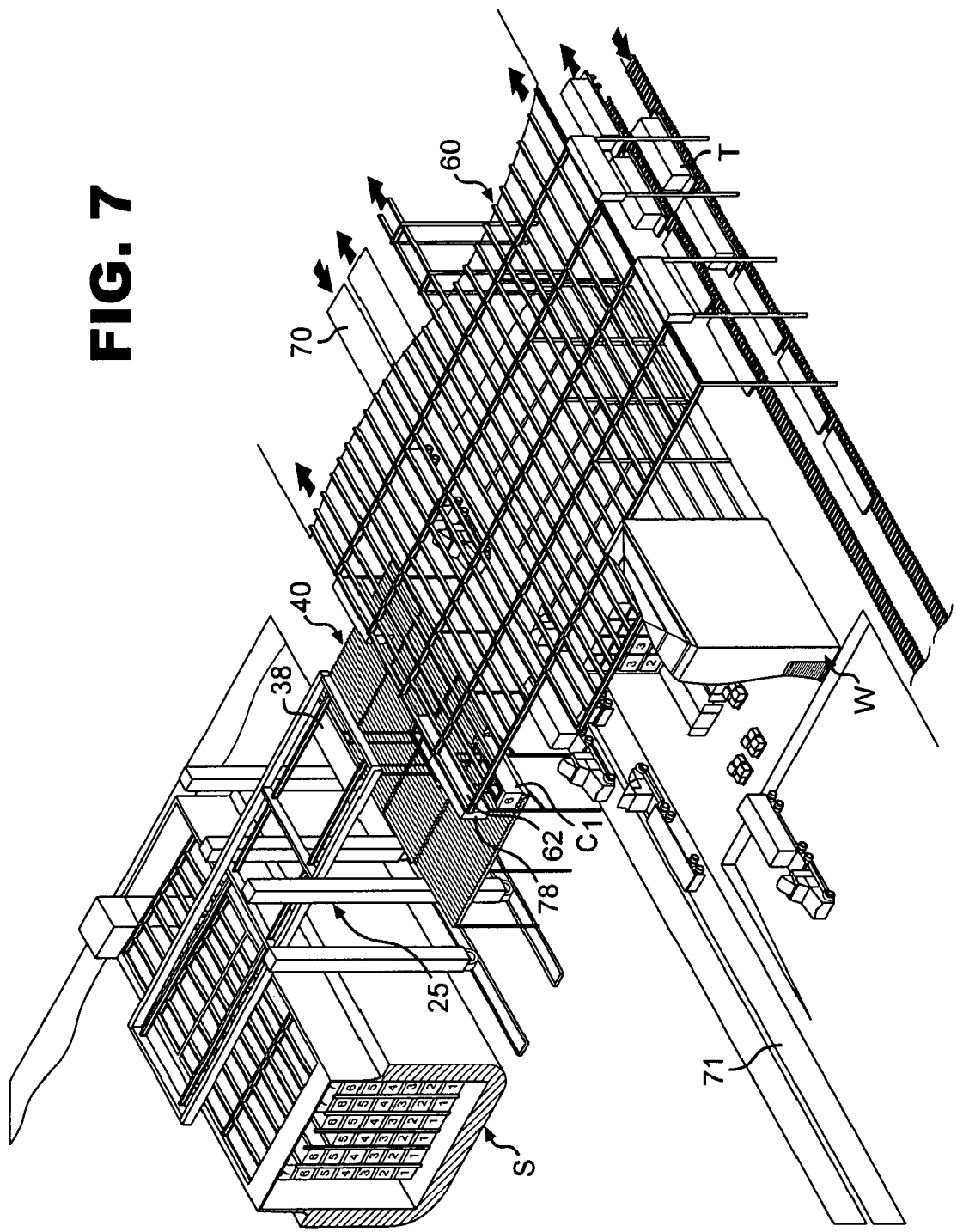
FIG. 7 is a perspective view similar to FIGS. 1-4 illustrating the shipping container of FIG. 6 being lowered onto the elevated transfer platform in a position to be engaged by a hoist device associated with the a gantry crane for loading the container into a storage cell within a hold area of the ship while the gantry crane is lowering a container from the ship onto the elevated platform for subsequent pickup by the overhead transfer unit.
Figure 8:
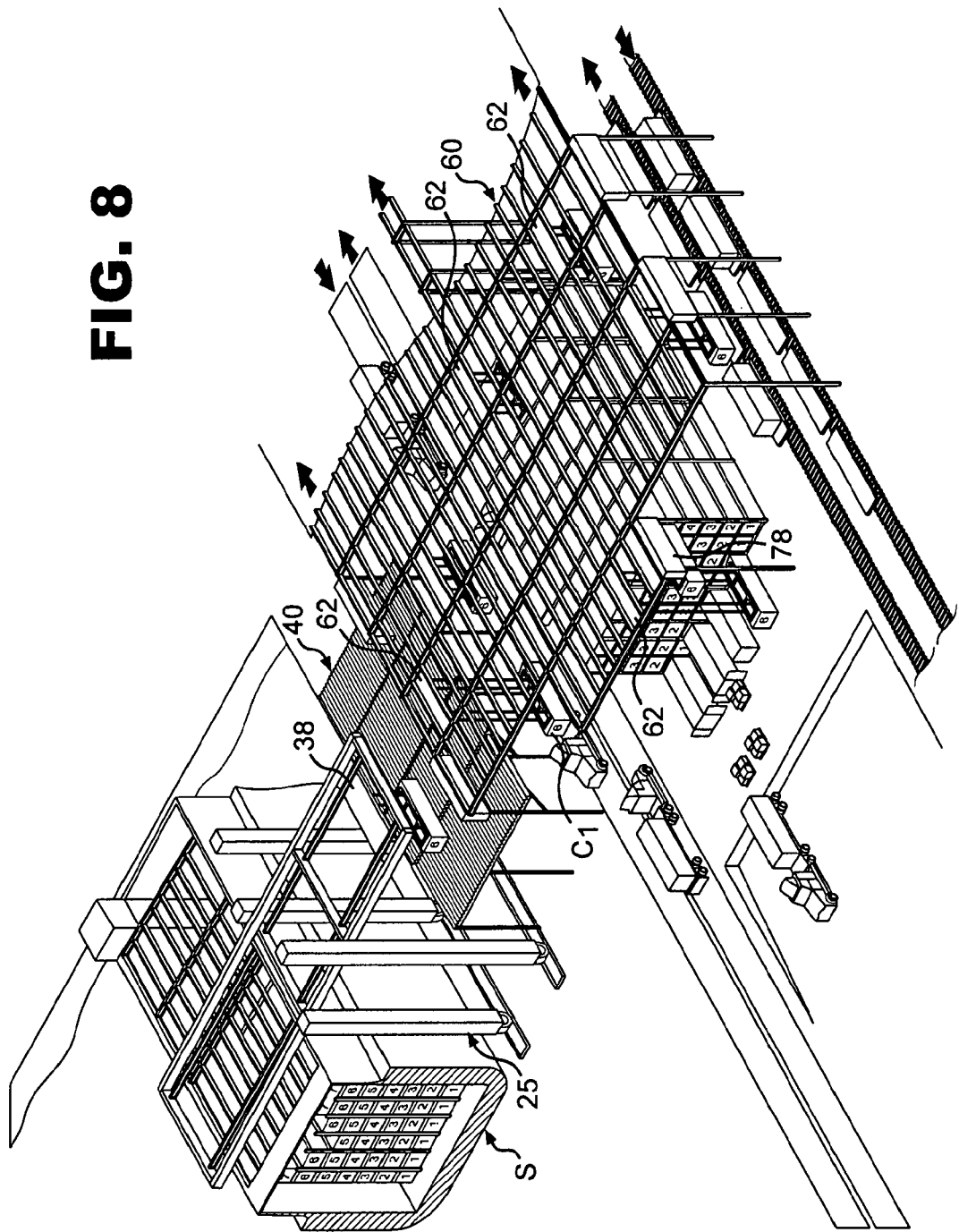
FIG. 8 is a perspective view similar to FIGS. 1-4 illustrating the shipping container of FIG. 7 being elevated from the elevated transfer platform by the hoist device associated with the gantry crane showing the container moving toward a storage cell within the hold area of the ship and also showing a newly loaded container being elevated toward a scanner before moving into the storage areas or transferred to a ship, train or truck and further showing other transfer units lowering containers to trucks and trains.
Figure 9:
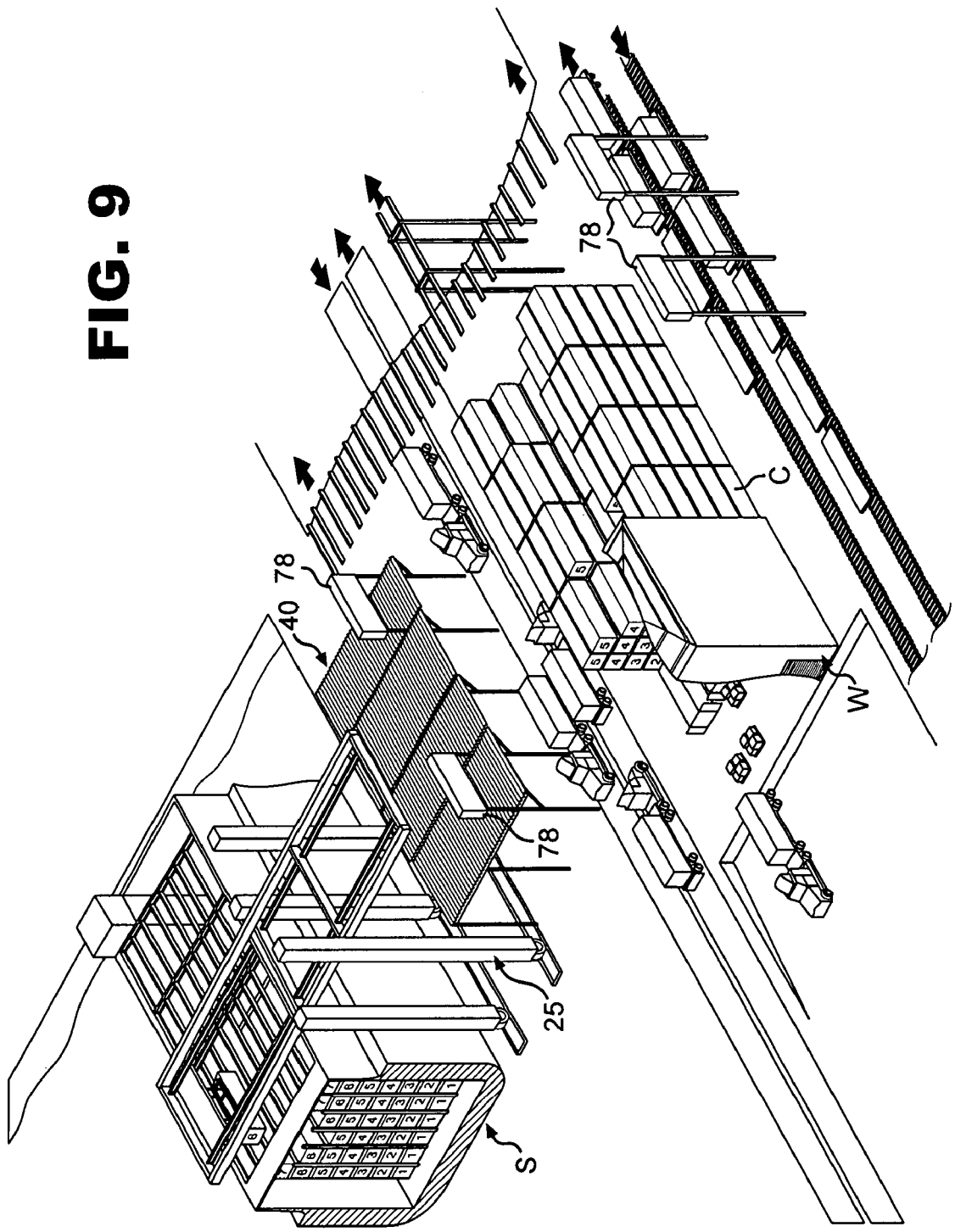
FIG. 9 is a perspective view similar to FIG. 7 having the overhead track grid system removed for clarity and illustrating the shipping container of FIG. 8 being lowered by the hoist device associated with the gantry crane into a storage cell within the hold area of the ship.

As further shown in FIG. 1, the gantry crane includes four support legs 26 that are mounted to rollers or wheels 28 such that the crane may be moved along guide tracks 30 to adjust the positioning of the crane relative to the ship. The gantry crane also has a horizontal support frame 32 having elongated beams 33 connected by transverse reinforcing beams 34. A pair of spaced and parallel guide tracks or rails 35 are carried by the frame 32. A first portion 32A of the frame and guide tracks are cantilevered over the hold of the ship such that a hoisting vehicle 38 suspended from or otherwise movable along the tracks 35 may be maneuvered over the hold cells "HC". A second portion 32B of the frame is cantilevered in a direction opposite the first portion over an elevated transfer platform 40 constituted, preferably, by a series of roller conveyors 42. In this manner, after a container "C1" has been removed from the storage hold of the ship using the transfer vehicle 38, the hoisting vehicle moves under its own power from the outer or first portion of the frame 32A to the inner or second portion 323 of the frame so that the container may be lowered to one of the roller conveyors 42. After being released from the vehicle 38, the containers automatically move toward an inner transfer section 44 of the platform 40 so as to be positioned to be selective moved by at least one transfer vehicle 62, see FIG. 4. Although the platform is preferably shown as being elevated, in some systems, the transfer platform may not be elevated.

The hoisting vehicles 38 includes a platform mounted by roller or wheel assemblies, not shown, to the pair of tracks or rails 35 so as to be movable in reciprocating manner between the ship and the elevated receiving platform. Mounted beneath the platform is a conventional spreader beam 50, see FIG. 4, having automatic locks for securing the spreader beam to the corner lock boxes associated with one of the shipping containers. The spreader beam is suspended and deployed using cables 53 associated with winches, not shown, that are mounted to the underside of the vehicle platform.

With continuing reference to FIG. 1, the port area of the present invention is specifically designed to permit immediate transfer of shipping containers between container ships and conventional land based means of transportation such as trains "T" and trucks "TR" or between outside temporary or longer storage areas such as one or more warehouse structures "W" with no more than one transfer point. In some embodiments, one or more warehouses may be enclosed by side walls 55 covered by a roof 56. In the drawings, most of the walls and roof are removed to show the storage area and cells within the warehouse. In some other embodiments, the storage areas may be open and not enclosed be roofing or walls. As previously described, one of the express purposes of the present invention is to maximize the number of shipping containers that can be stored in a given area. To do this, it is necessary to provide a storage system that is free from isles between the stored containers "C" and that allows an efficient vertical stacking of the containers.

To order for the foregoing objectives to be achieved, the port facilities of the invention use a container transfer and storage system on land that consists of an overhead grid guide track or rail system 60 that can be as high as the containers can be stacked and cover an entire storage area to store as many containers as an area can accommodate. As an example, 3,673 forty foot containers can be stored on four acres, stacked seven containers high, or 4,198 stacked eight containers high. This is based on approximately 8 feet×40 feet containers (8 feet wide×40 feet long) with other configurations yielding different numbers.

The overhead grid track system is specifically designed to permit the simultaneous movement of a plurality of the transfer vehicles or units (TUs) 62 between the elevated receiving platform 40, the warehouse(s) "W" or the open storage area(s) 72, a truck loading/unloading area 63, a railway loading/unloading area 64 and, in some instances, additional storage areas or warehouses 65. To accomplish this, the overhead grid guide track system includes a plurality of parallel rails 66 that extend inwardly of the dock side that intersect with a plurality of transversely oriented and parallel rails 67. The structure of the rails 66 and 67 will be described in greater detail hereinafter. Because of the intersecting rails 66 and 67, the transfer vehicles (TUs) 62 can move in an X-Y plane to maneuver shipping containers between the various modes of transportation and the storage areas and warehouses. In essence, the entire container storage area can be covered by the grid guide track system so the transfer units (TUs) 62 can traverse the entire storage area. A four-acre storage area can accommodate twenty or more TUs. As the demand for more container movement speed increases, more TUs can be added to the grid system.

As shown in the drawing figures, a first portion 68 of the grid system extends above the transfer platform 40. The next inner portion 69 is a truck loading and unloading portion above incoming and outgoing travel lanes 70 and 71 for trucks. There is also a warehouse enclosed portion 56 or other open storage area 72, a railway loading and unloading portion 73 above incoming and outgoing tracks 74 and 75, and a connector portion 76 to other transfer, storage or warehousing facilities. In some port facilities, a substantial portion of the grid system may be under roof and in others little or no roofing may be provided. With the system, multiple intermodal and truck/train inbound and outbound lanes and lines can be integrated to facilitate the movement of containers and goods.

Figure 2:
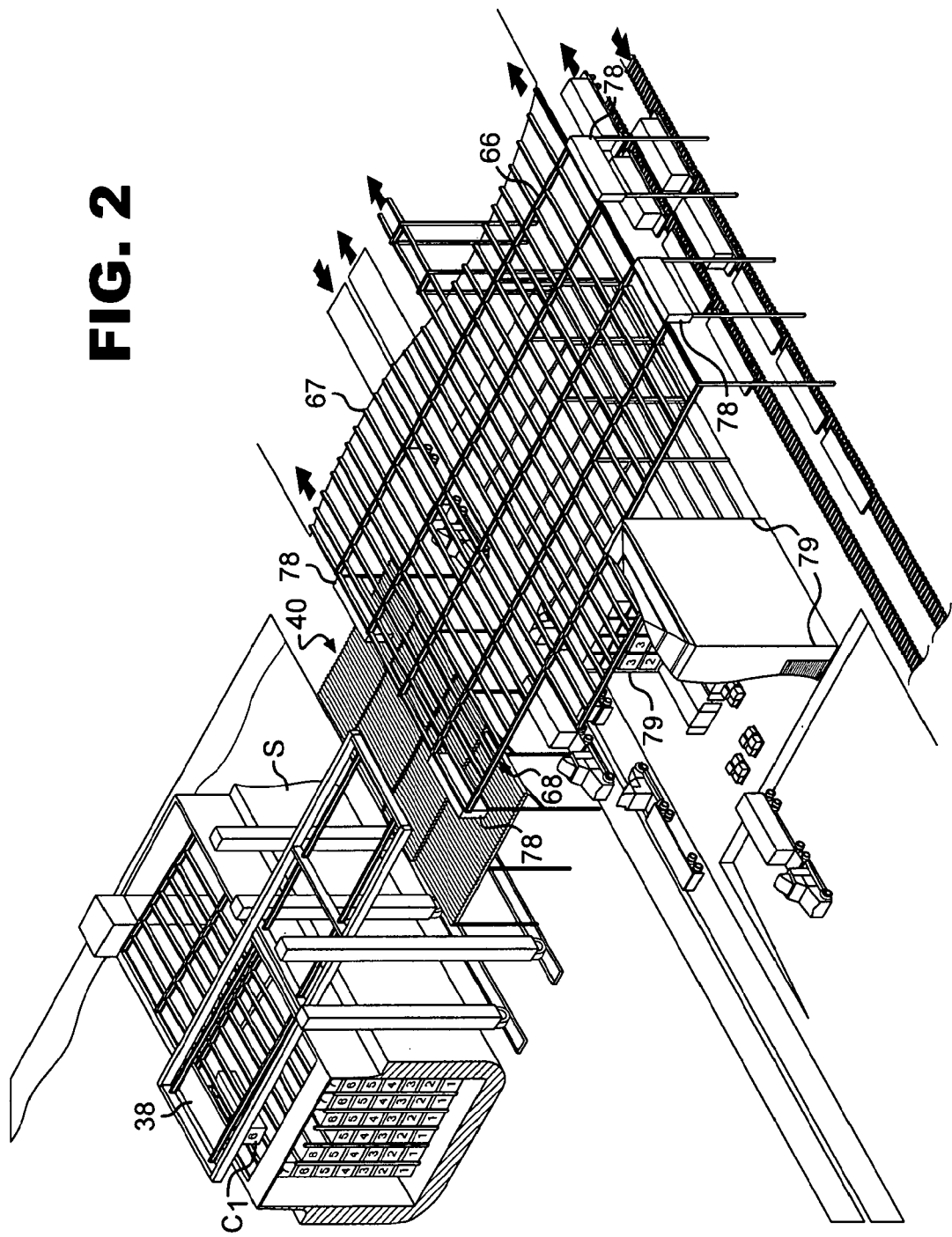
Figure 3:
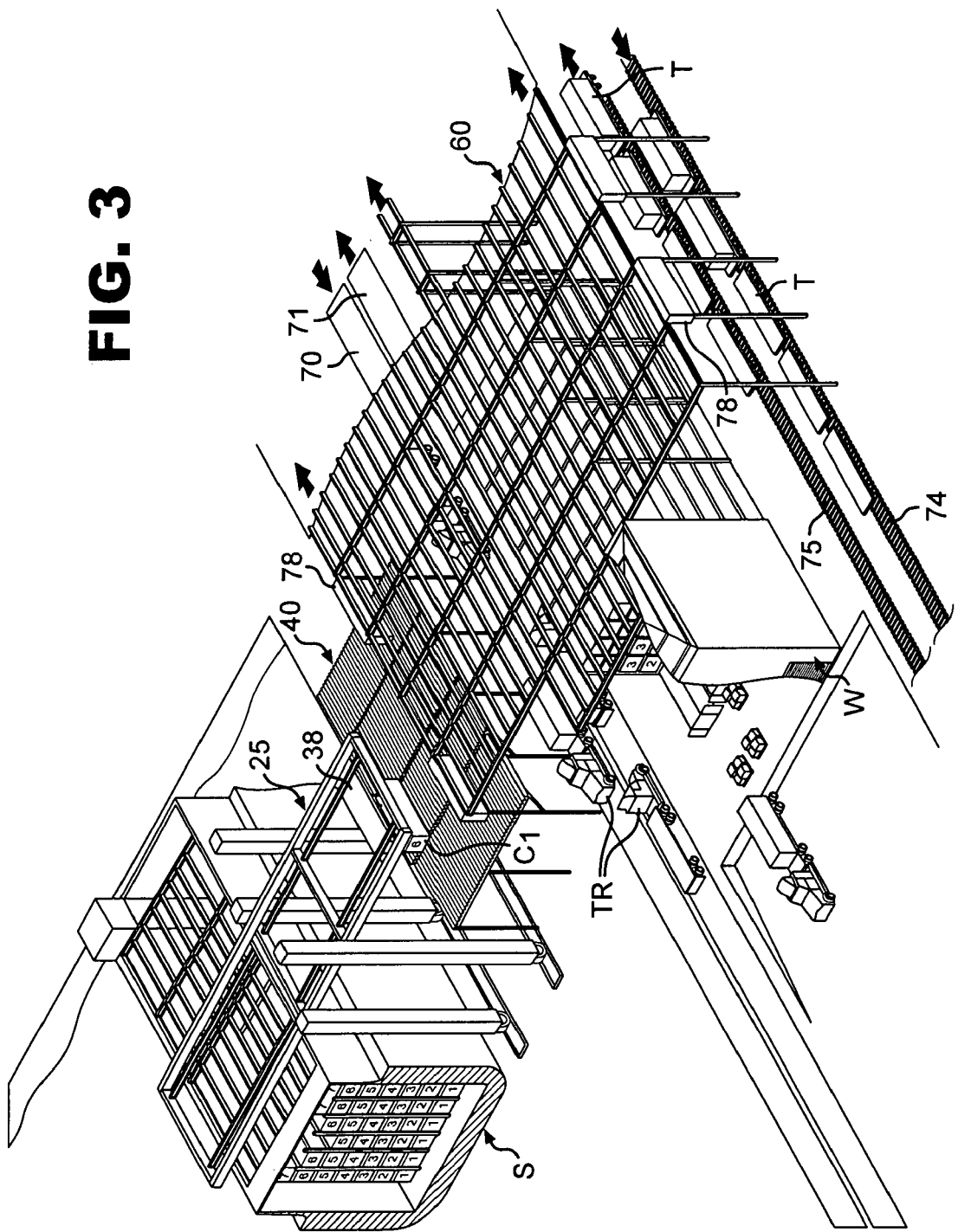

To increase the safety and prevent the movement of illegal and/or dangerous goods, explosive devices and the like, the system of the present invention provides one or more electronic shipping container screening devices such as X-Ray scanners 78, see FIG. 2. As shipping containers are being transferred from an inbound ship to any mode of land transportation or any storage area, the (TUs) will be used to move the containers adjacent one of the scanners 78 where they will be inspected. Likewise, containers being transferred from the storage areas or land transportation areas by the (TUs) may be moved to one of the scanning areas for inspection before being loaded into an awaiting container ship. As shown, the scanners are preferably elevated so that containers do not have to be raised and lowered for scanning purposes. In some instances, the scanning areas may need to at least partially enclosed. The type of scanning units may vary and remain within the teachings of the invention.

As with the storage areas described with respect to the ship, one or more open storage areas 72 or warehouse "W" may be used to efficiently and compactly store numerous shipping containers in side-by-side and end-to-end relationship. As previously noted, the containers are also stacked one upon another, however, sufficient space is left above the upper containers and the grid guide track system to permit temporary placement of at least one shipping container on an upper container of a vertical stack so that containers in any given vertical stack may be temporarily moved to allow containers stored in lower levels of the stack to be retrieved by the (TUs) after which the upper containers may be replaced. In addition to the foregoing, one or more open areas may be provided within the storage system for the temporary placement of containers being shuffled to permit access to lower placed containers.

Although the storage areas and warehouses may include separate container holding cells such as described with respect to the holding cells "HC" of the ship, it is possible to stack the containers without the vertical steel corner posts. In some situations, similar corner posts may be provided at several places in a warehouse for safety or structural reasons. As shown in FIG. 2, corner posts 79 are provided along the outer walls of the warehouse "W" or open storage areas 72 and the containers are stacked. As previously noted, the containers may be stacked to heights of seven of more containers and there is no need to provide isles between the container stacks.

Figure 12:
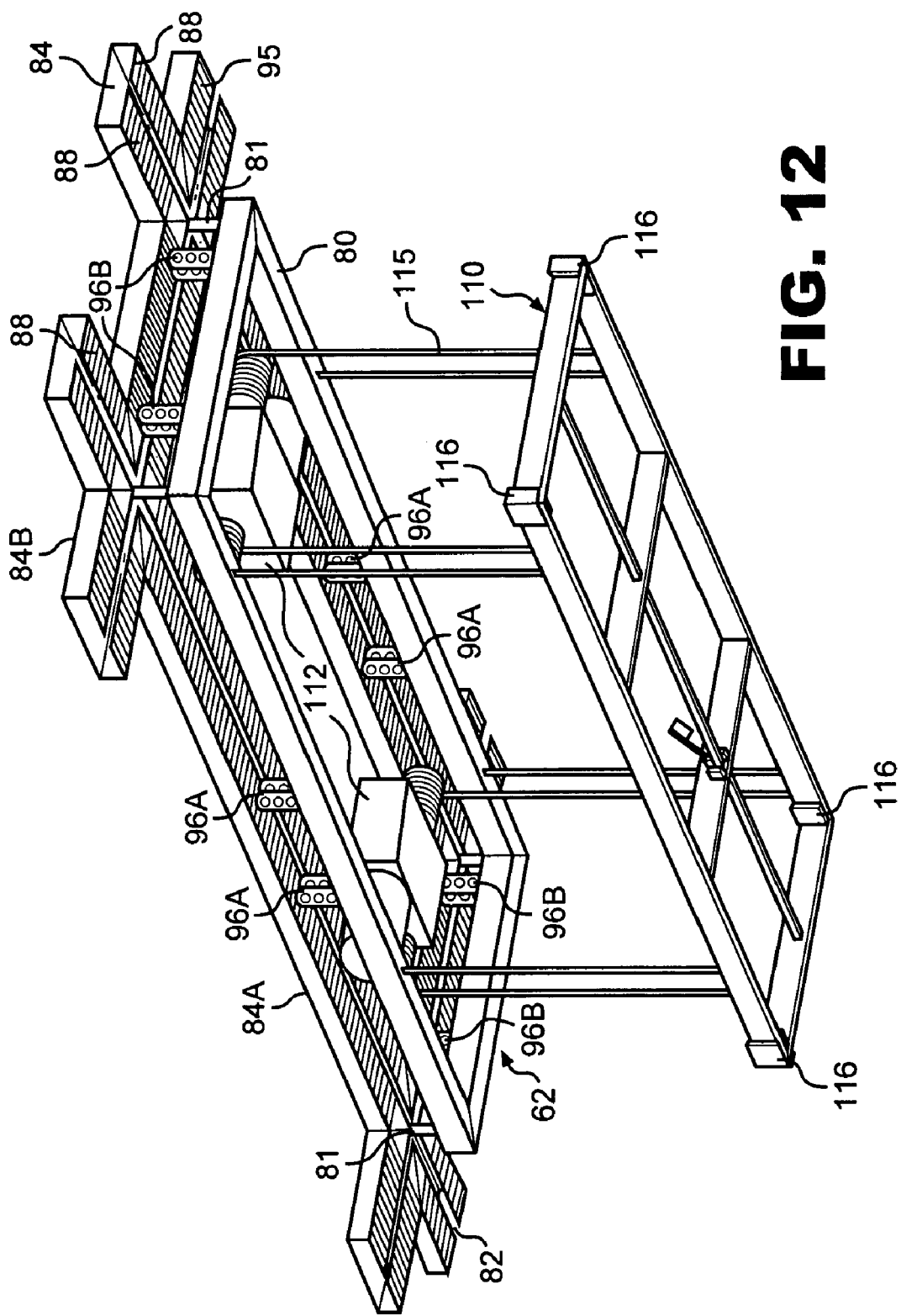
FIG. 12 is a perspective view of one of the transfer units of the invention shown suspended from intersecting sections of overhead tracks along which the transfer units are selectively movable in both "X" and "Y" directions and also illustrating a suspension frame for cooperatively engaging and securing one of the storage units of the invention as the storage units are moved about the system and storage facility of the invention.
Figure 13:
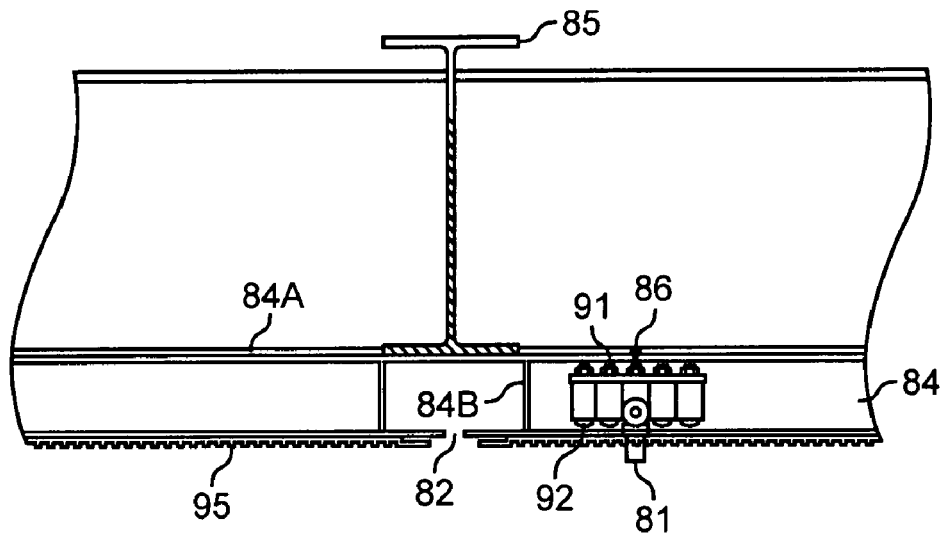
FIG. 13 is a partial cross sectional view through an intersecting section of the overhead guide tracks of the invention and showing a side view of one of the roller assemblies that support the transfer units of the invention.
Figure 14:
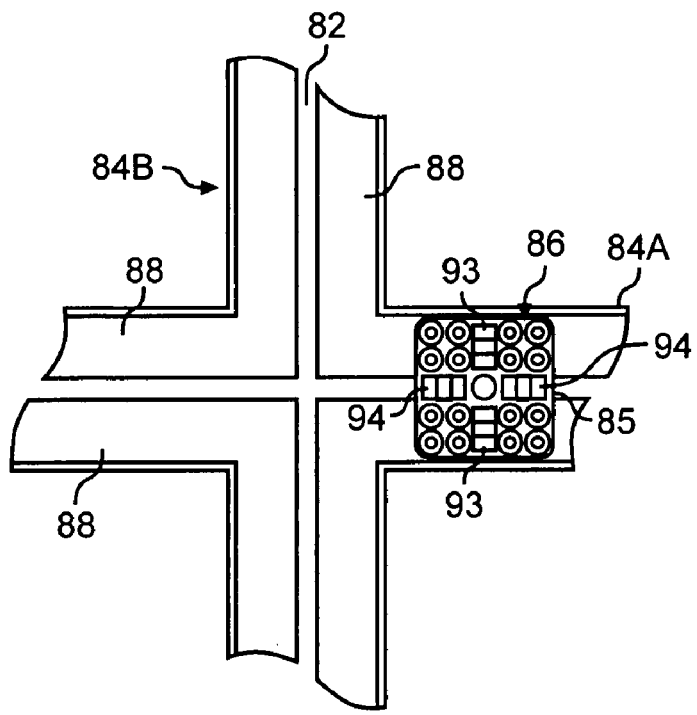
FIG. 14 is a partial top plan view of FIG. 13, showing the intersecting section of the overhead guide tracks of the invention and one of the roller assemblies that support the transfer units of the invention.
Figure 15:
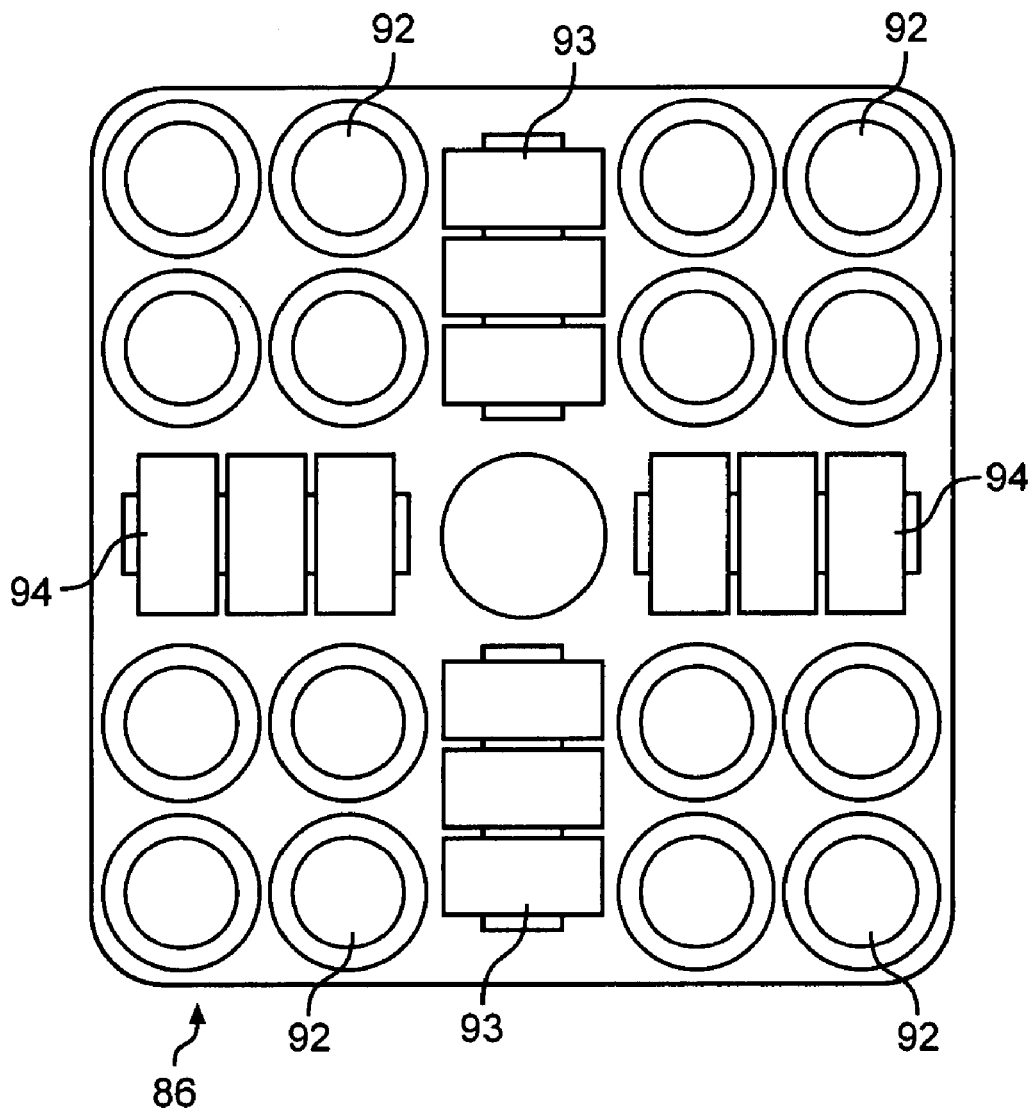
FIG. 15 is a bottom view of one of the roller assemblies of the invention which support the transfer units from the guide tracks.

Referring to FIG. 12, one of the transfer units (TU) 62 is shown in detail. The (TU) includes a body having upper and lower surfaces, which in the embodiment shown, includes a rectangular frame 80 that is made of steel or other appropriate material that may be covered by steel sheet metal along the upper and side surfaces. The frame 80 is supported at each of the four corners thereof by support or pilot hanger shafts 81 that extend upwardly from the frame and through open slots 82 that are provided in the overhead grid guide track system 60. The grid guide track system is formed by a plurality of hollow steel box beams 84 that are bolted, welded or otherwise secured to steel girders or roofing "I" beams 85, see FIG. 13, so that the open slots 82 are oriented downwardly. The beams 85 are supported by steel columns or posts 87 and the corner posts 79, see FIG. 1. The track system extends above the periphery of each of the underlying imaginary or real storage cells within the storage area of the system in such a manner that the transfer units (TUs) may be directly and selectively aligned above the cells so as to place a shipping container into a cell space or elevate a container from a cell space. Load bearing flanges 88 are formed on opposite sides of the slots on which roller carriages 86 are movably supported. Each of the pilot hanger shafts 81 is centrally secured to a separate roller carriage 86.

The box beams 84 that form the grid track system include both longitudinally extending sections 84A and transverse sections 84B that are oriented at generally right angles with respect to one another. The roller carriages include upper and lower heavy duty roller ball sets 91 and 92, respectively, that guide the carriages within the box beams with the lower set bearing the weight of the transfer units (TUs) 62 and the shipping containers. Alternatively, the roller carriages can only include a lower heavy duty roller ball set for guiding the carriages within the box beams 84. Each carriage also includes two pair of wheel sets 93 and 94, with the wheel sets 93 engaging the flanges 88 of the longitudinal sections 84A and the wheel sets 94 engaging the flanges 88 of the transverse sections 84B. The carriages can be constructed using unidirectional rollers and spherical ball rollers, unidirectional rollers and casters, high strength/low coefficient plastic or other appropriate means.

The lower surfaces of each of the track sections 84A/B are engaged by drive wheels 96A and 96B of drive assemblies carried by the transfer units 62. With specific reference to FIG. 12, each transfer unit 62 includes eight drive wheels 96A/B, two on each side of the frame 80 that are engaged with the longitudinal box beam sections 84A and two at each end of the frame for engaging the transverse beam sections 84B.

Figure 16:
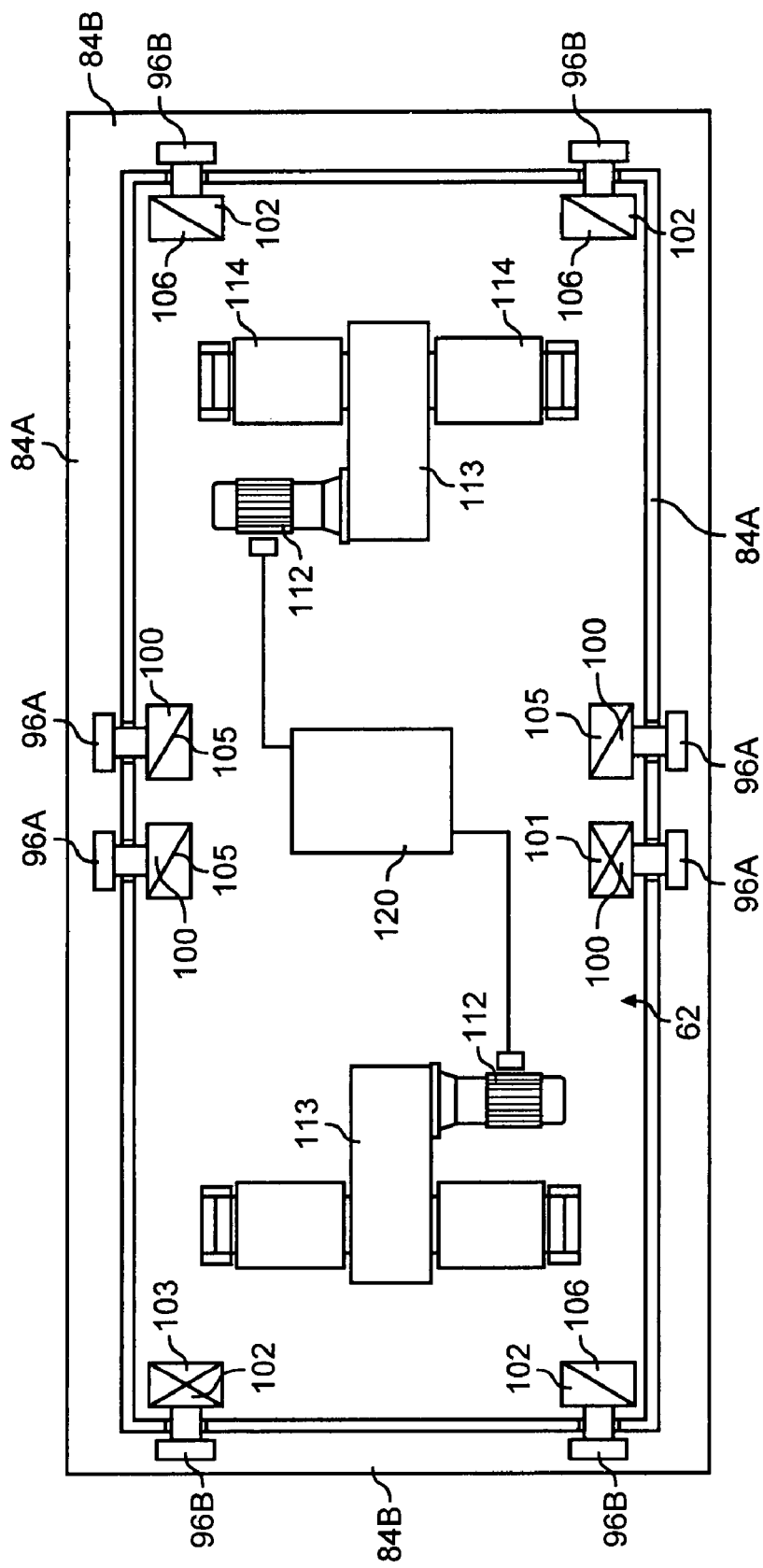
FIG. 16 is a top plan view of an alternative embodiment of the transfer unit of FIG. 12 showing portions of segments of an overhead guide track system superposed over rubber drive wheels of the transfer unit.

FIG. 16 is a top plan view of the transfer unit 62 showing four track sections 84A/B superimposed over the rubber drive wheels 96A/B with two of the track sections being the longitudinal track sections 84A and two being the transverse sections 84B. Drive motors 100 are attached to each of the rubber drive wheels 96A. Drive motors 102 are attached to drive wheels 96B. The drive motors 100 are controlled by a master encoder 101 on one of the drive motors 100 to move the TU along one of the longitudinal track sections 84A. Another master encoder 103 on one of the drive motors 102 for moving the TU along one of the transverse track section 84B controls the motors 102. The master controllers 101 and 103 control slave encoders 105/106 on the other drive motors 100/102, respectively. In this manner, the drive motors 100 are controlled such that to move the transfer unit 62 longitudinally along the grid track system from the front of the overhead grid track structure to the back thereof and vice versa, as shown in FIG. 1, the master encoder 101 controls the drive motors 100 to move the TU along the longitudinal track sections 84A. Likewise, to move the transfer unit 62 transversely along the grid track system from one side thereof to the opposite side and vice versa, the master encoder 103 controls the drive motors 102.

Each transfer unit (TU) 62 is designed to raise and lower at least one shipping container using a spreader beam 110, see FIG. 12, that is designed to automatically lock with the corner locks associated with all conventional shipping containers. The spreader beams may be expandable so as to be usable to lift both 20-foot, 40-foot and 45-foot containers. The spreader beams may also include remote controlled cam locks for the containers.

To control the vertical movement of the spreader beams, two hoist motors 112 are mounted to each secondary transfer unit. The outputs from these motors are connected through power splitters 113 to pairs of winding drums 114. Cables 115, as shown in FIG. 12, depend from the drums 114 to lower ends that are fixed to the spreader beam or lifting frame 110. As the spreader beam 110 is lowered toward an underlying shipping container, by activation of the motors 112, the spreader beam will engage about the upper periphery of a container, after which, corner locks 116 are automatically tripped to engage the lock boxes of the containers such that the container can be elevated to a position immediately adjacent the transfer unit 62. In this position, the transfer unit 62 can be moved along the grid track sections 84A and 84B so as to move containers as desired.

Power to the motors, winches and other devices associated with each of the transfer vehicles or units (TUs) and secondary transfer units or vehicles may be provided by onboard rechargeable batteries 120. AC power may also be supplied to the (TUs) through a conventional electrical raceway or an inductive power raceway system, not shown. Also, it is contemplated that the motors used to power the drive gears may be anti-backdrive motors that will enable the (TUs) 62 to operate or move horizontally at approximately 60 feet per minute when fully loaded with a container and at approximately 90 feet per minute with no load. The hoist motors may be two 75 horse power motors. The hoists may lift fully loaded containers at a rate of approximately 75 feet per minute and may operate at up to 112 feet per minute with no load.

Figure 17:
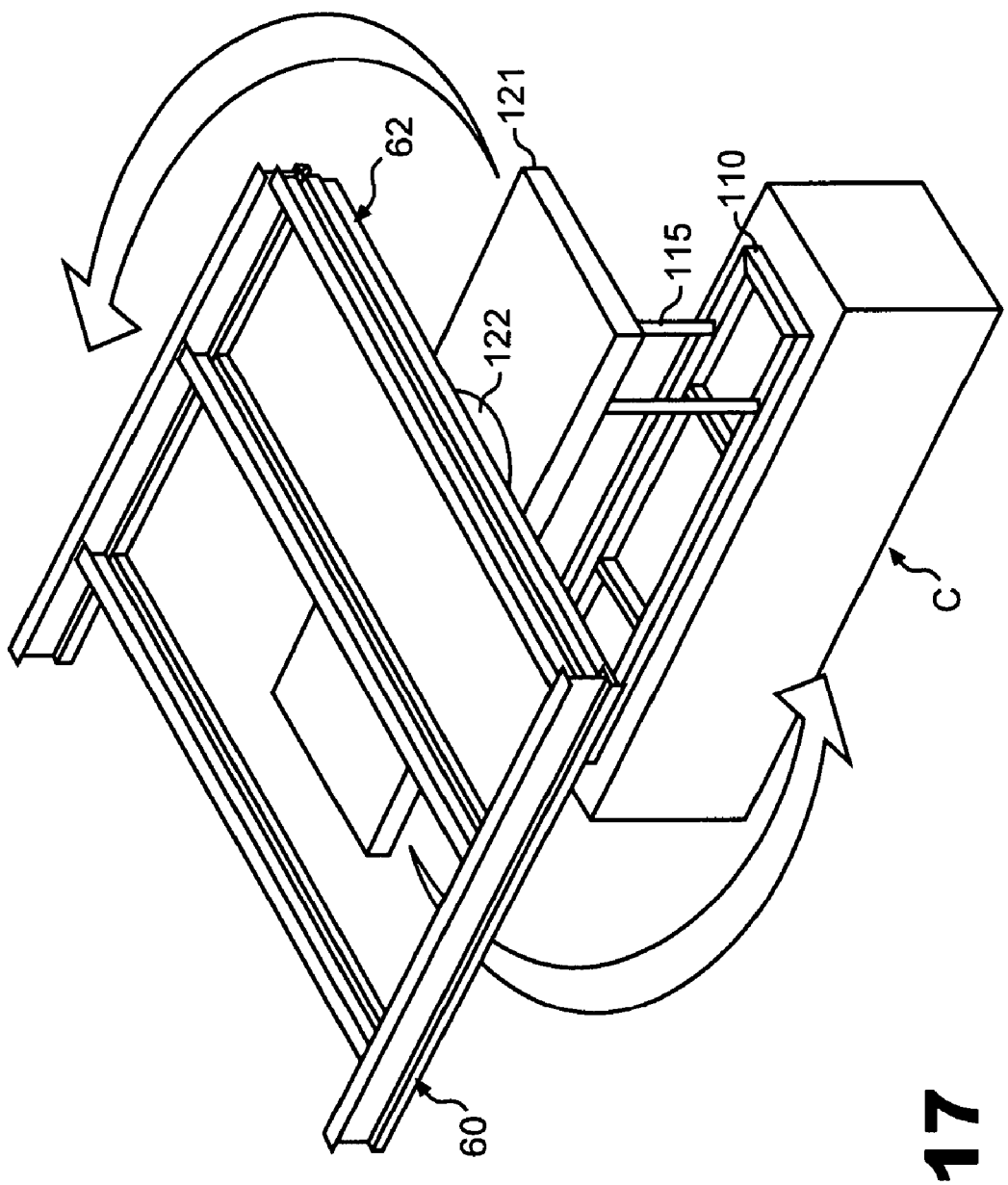
FIG. 17 is a perspective view showing the transfer unit of FIG. 12 covered with a top panel and provided with a trunnion for supporting a secondary platform to which hoisting equipment of the transfer unit are mounted such that the secondary platform and the spreader beam supported therefrom are both pivotal in a 360° rotation relative to the transfer unit.

With specific reference to FIG. 17, as the grid guide track system of the invention is generally laid out in X-Y intersections of the tracks or beam sections 84, in some embodiments the (TUs) 62 may be modified to permit the spreader beam 110 to be rotated through 360° so as to be able to universally adjust the orientation of a container "C" relative to a receiving surface, such as a trailer bed or flat car bed. To permit such movement, a lower platform 121 is connected below and to the (TU) frame 80 by way of a trunnion assembly 122. In this embodiment, the two hoist motors 112, the power splitters 113 and pairs of winding drums 114 are mounted to the platform 121. The trunnion assembly includes a circular rack having teeth that mesh with teeth of a beveled drive gear rotated by a trunnion motor, not shown, mounted on the platform. The trunnion motor includes a reversible output drive shaft so that the platform 121 may be rotated both clockwise and counterclockwise as shown in FIG. 17. The trunnion motor may also include an anti-backdrive gear to lock the platform in position relative to the (TU) frame 80 whenever the trunnion motor is not being driven.

Figure 18:
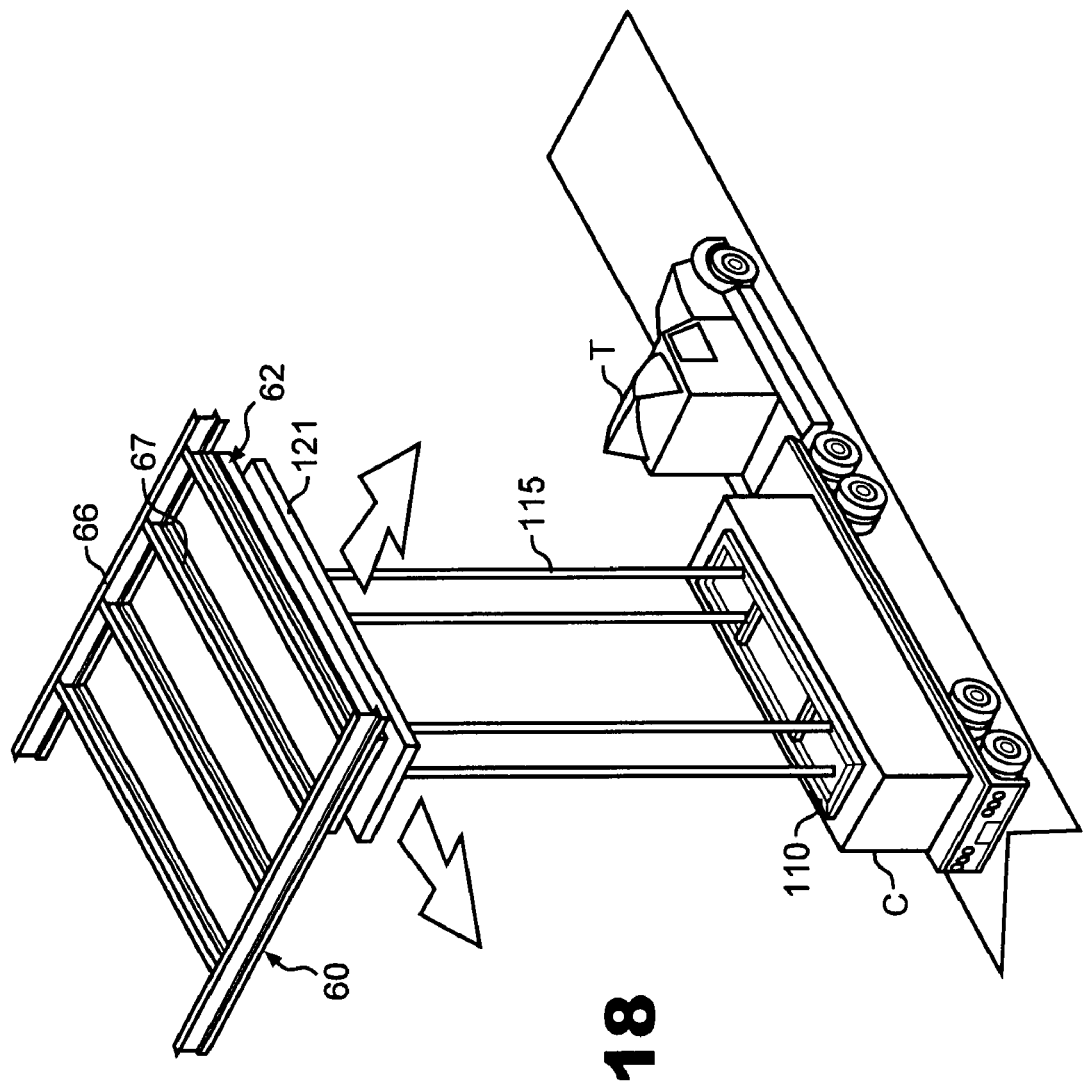
FIG. 18 is a perspective view showing the transfer unit of FIG. 12 covered with a top panel and provided with a linkage system for supporting a secondary platform to which hoisting equipment of the transfer unit are mounted such that the secondary platform and the spreader beam supported therefrom are both movable in an X-Y motion relative to the transfer unit.

As opposed to the revolving capability of the platform 121 of the (TU) shown in FIG. 17, the platform 121 may be mounted to the (TU) frame 80 by secondary longitudinally and transversely extendable slide tracks associated with the (TU) frame and platform that permit the platform to be moved outwardly on at least three and preferably all four sides of the frame 80 as is illustrated by the arrows in FIG. 18. Such a mounting arrangement permits a limited shifting or X-Y translation of a container secured to the spreader beam or lifting frame 110 associated with the (TU) 26.

Figure 11:
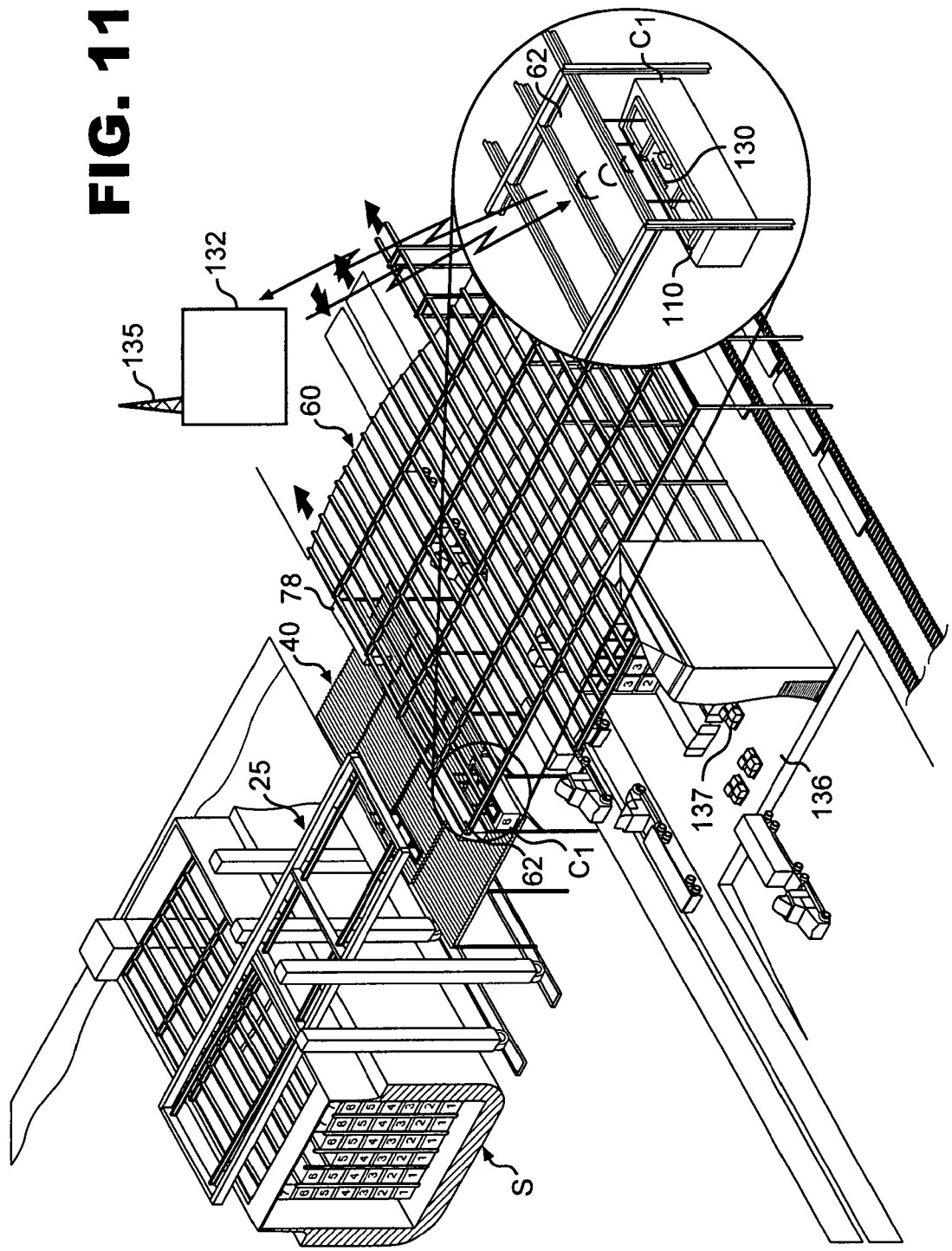
FIG. 11 is an illustrational view of an inventory management system used with the invention wherein bar code or other primarily passive tags are used to permit remote control of containers and inventory within the port storage and transportation system of the invention.

The system of the present invention may be fully automated and interfaced with an inventory control system so that the location of each container within the system is known at all times. By way of example and as shown in FIG. 11, bar codes, RFID tags or other identification means 130 may be placed on each container and on each transfer vehicle or unit within the system. An inventory management center 132 is provided that includes a radio signal transmitter 135. Utilizing directionalized frequency transmissions, remote tags 130 are located. The tags not only include information as to the identity of the container but may include information concerning the contents, the identity of the shipper and of the receiver as well as any other information that may be of interest to port or transportation personnel, government authorities and others. Once a (TU) is secured to a container through the spreader beam 110, a control computer within the management center will follow the movement of both the container and the (TU). In some instances where it is known that a particular container being off loaded from a container ship is to be transported by an identified ground transporter, such as a truck or train, the container may be moved directly from the ship or transfer platform to an awaiting truck or rail car or moved to a loading dock area 136 where the contents 137 of a container may be separated for shipment in smaller volumes, as is illustrated in FIG. 11. In instances where containers are to be off loaded from a ship or from a ground transportation source and placed into storage for future shipment, information is communicated to the (TUs) to move the containers to specific locations within the system, such as a given stacking area within the open storage area(s) or the warehouse(s).

In addition to the foregoing, in some embodiments, the transfer units being remotely controlled may include transceivers 146 for communicating with the central control system or inventory management center 132 of the port, however, in other instances, the transfer units may be controlled from a remote location using radio frequency technology, Global Positioning Technology (GPS) and the like.

Figure 19:
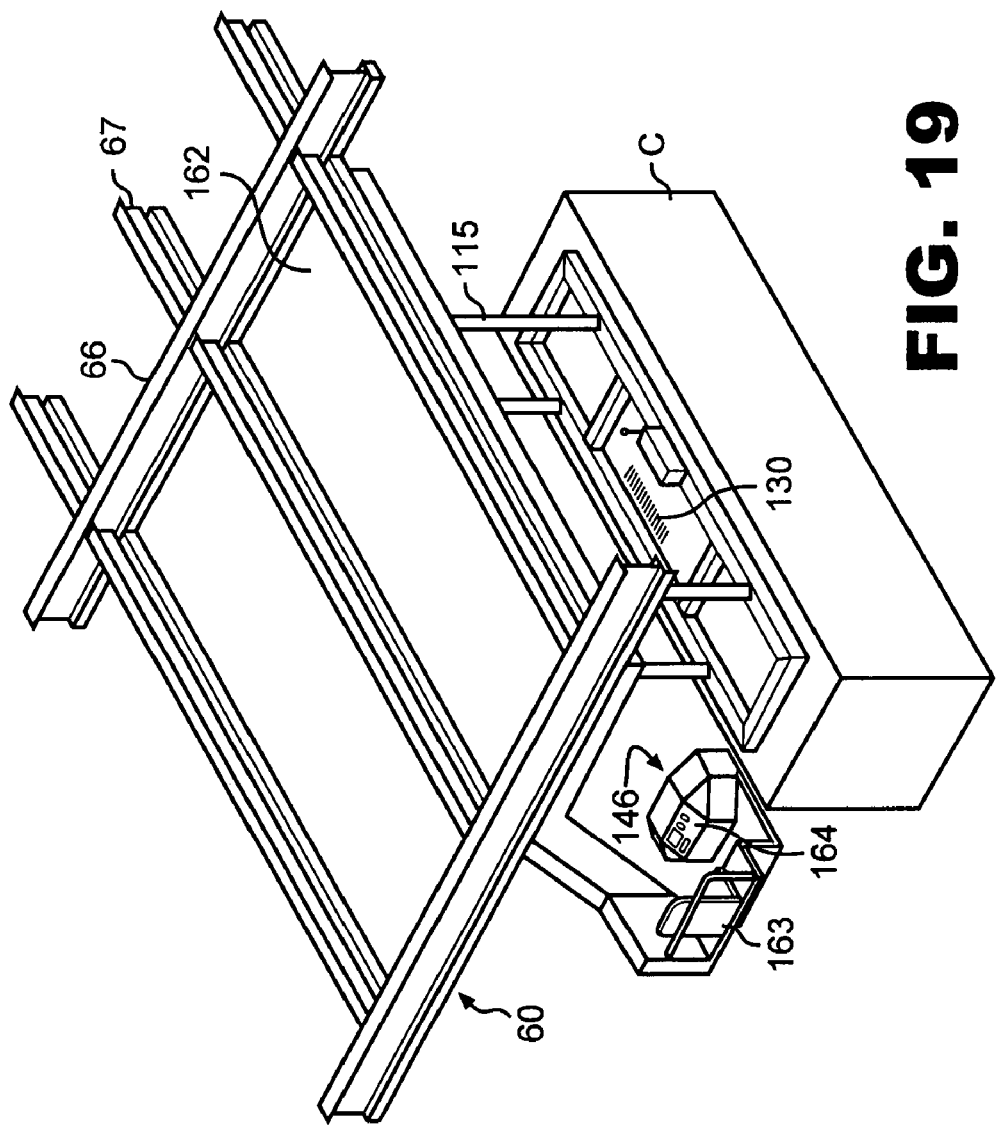
FIG. 19 is a perspective view of a transfer unit of the invention which is modified to include an operator support console.

The present invention may also provide for manual or partial manual control of the transfer vehicles. With reference to FIG. 19, another modified transfer unit 162 is shown which includes an operators station extending downwardly and outwardly relative to the body or frame 80 of the vehicle so as to be clear of the grid guide tracks. The station includes a seat 163 and control consol 164 for manually controlling each of the motors and hoist devices associated with the transfer unit. In some systems, both manual and remote controls may be used.

In addition to remote communications control of the movement and location of the transfer units (TUs) and containers of the invention, sensors and the like may be affiliated with the motors, winches, drive gears and the like of the invention in order to monitor the exact location of the vehicles and containers. Digital input from drive motor rotations and registration at digitized check points along the grid system or at each cell location within a ship or within a storage area or warehouse may also provide information relating to the movements of the (TUs) within the system. The hoist motors may also have digitized features for determining the exact elevation and relationship of the transfer beams to each (TU) when raising and lowering a container. The drive motors may be controlled by master encoders and synchronizing slave encoders with X-Y position sensors located within the grid track system for position identification and/or verification.

As previously described, for security purposes, before the containers are allowed to be placed into storage or moved from one form of transport to another, the containers are moved adjacent one of the scanning devices 74 at which time the contents of the containers are scanned and compared or matched against computerized bills of lading to verify the contents of the containers and to prevent the movement of illegal or hazardous goods and/or devices. As the scanners are located at elevated locations along the grid track system, the containers do not have to be cyclically raised and lowered. The overhead grid guide track system is specifically designed to eliminate repetitive container transfers between numerous container handlers and to minimize vertical container movement in order to reduce the time of movement of the containers within the system from one point to another.

Figure 20:
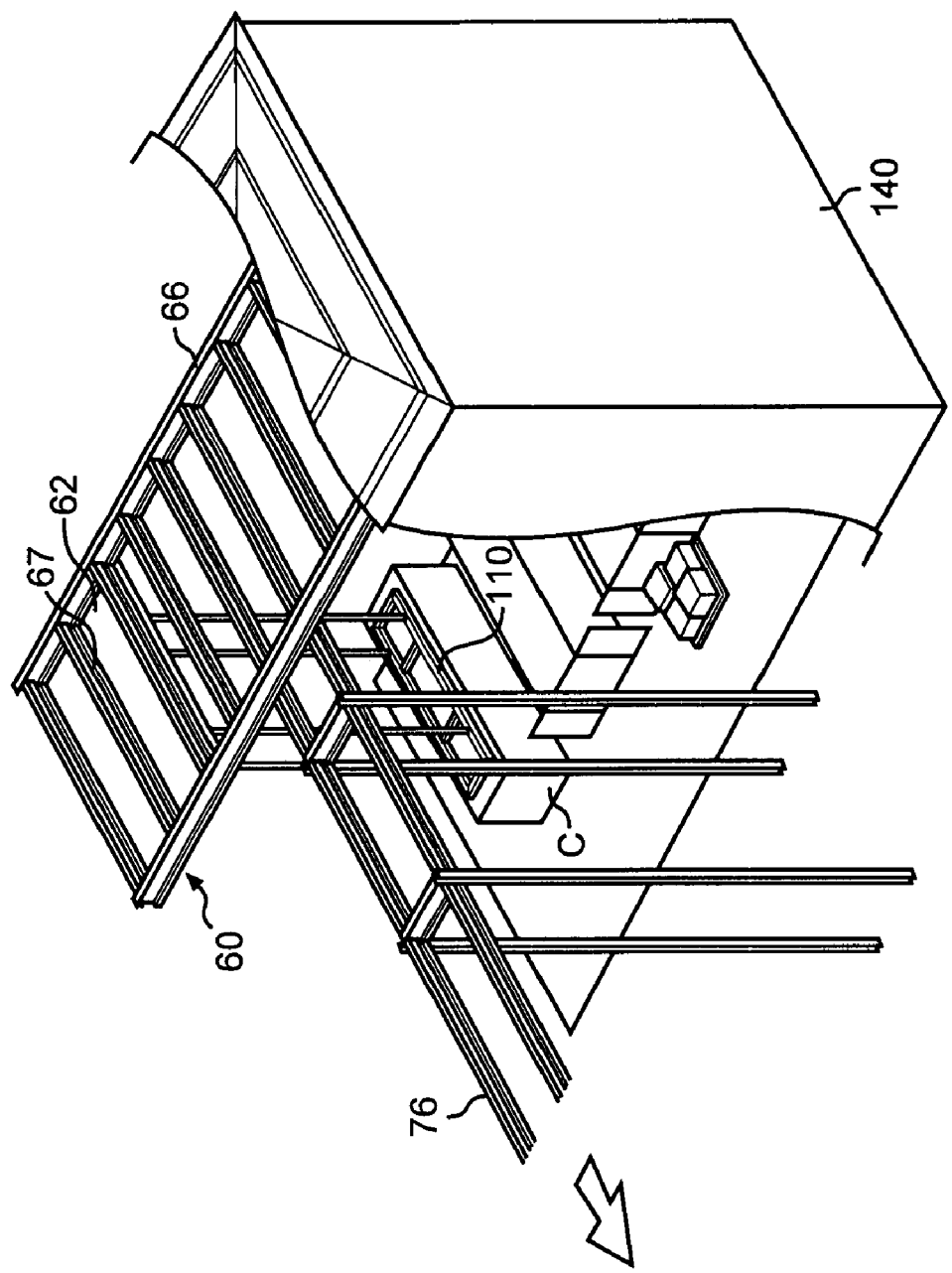
FIG. 20 is a perspective view of an inspection station associated with the systems of the invention.

With reference to FIG. 20, in the event the contents of a scanned container appear to be suspicious, the port system of the invention also includes an inspection station 140 where a questionable container can be placed and the contents thereof inspected by port officials. Once a container is cleared by inspection, the container may be transferred to storage or to an appropriate transport vehicle or ship.

Utilizing the system of the invention, a designated container may be automatically located within a warehouse, storage area or ship's hold and containers above the designated container may be moved appropriately and, thereafter, relocated once the designated container has been retrieved utilizing the transfer units and their hoist mechanisms.

Once a designated container is located on board a ship it may be selectively elevated and positioned for retrieval from the hold utilizing one of the transfer vehicles associated with the bridge crane as previously described. Loading of the ship's hold can also be fully automatic with each container being placed at a predetermined location within the hold as containers that are placed on the elevated transfer platform are loaded into the ship's hold.

Figure 10:
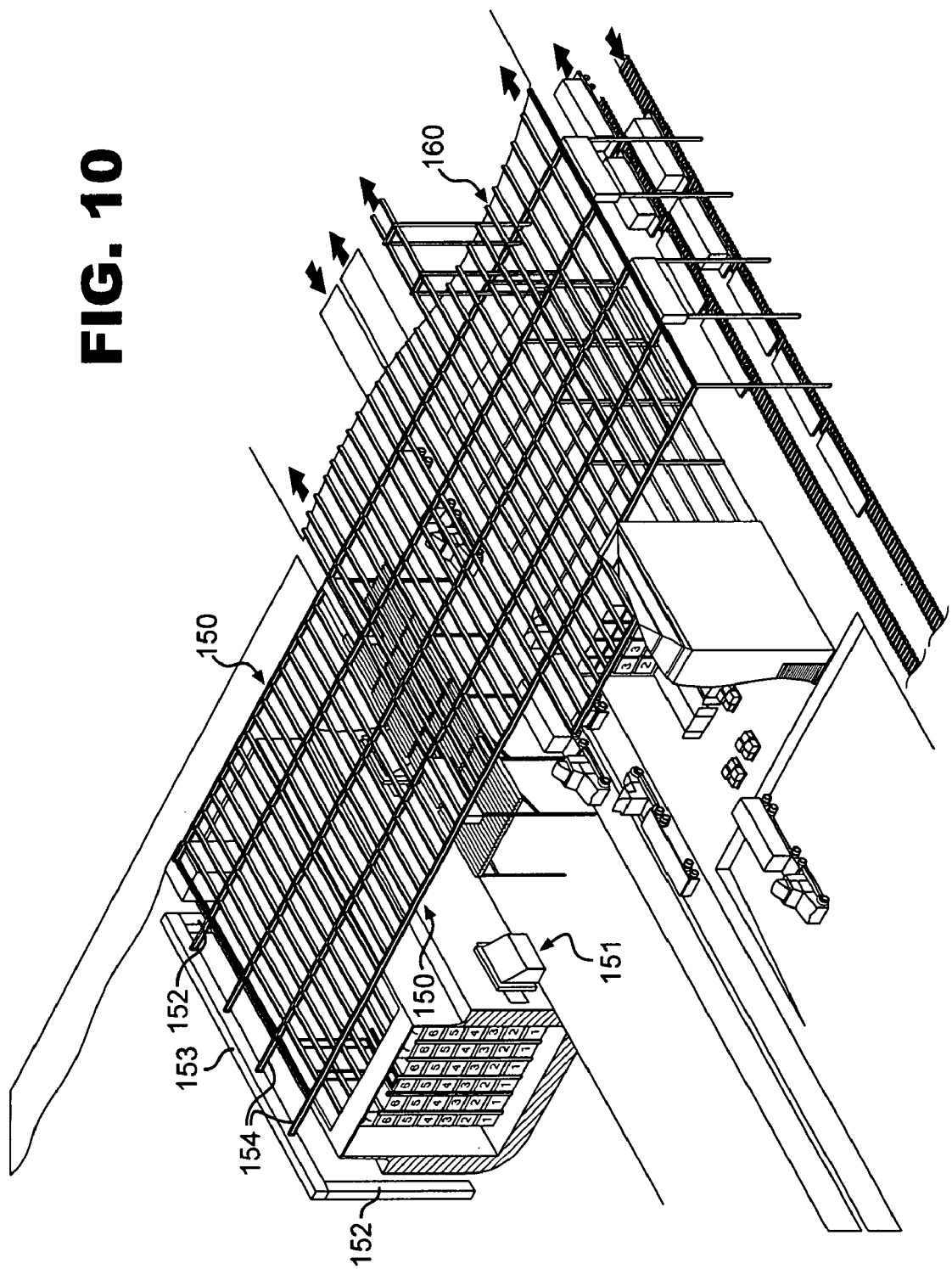
FIG. 10 is a perspective view of an alternate embodiment of the invention wherein the elevated transfer platform is not used but rather the grid track system of the invention is extended over a berth area for a container ship so that the overhead container transfer vehicles or units of the invention are used to both load and off load containers relative to a container ship as well as to move containers to and from land carriers such as rail cars and trucks.

With specific reference to FIG. 10, a variation of the grid guide track system of the invention is shown wherein the grid tracks have been extended as shown at 150 to replace gantry crane and the transfer platform and related conveyors used to load and off load ships. This system has the added advantage that it eliminates the need for separate cranes or container handling devices to either off load or load containers relative to the cells within the hold area of the container ships. Such a system not only reduces costs by reducing the number and types of cranes and hoisting devices that are necessary for handling the shipping containers, but the use of a single transfer unit 62 to initially engage a container from any transportation source or storage area within the system and move the container to any other point in the system significantly reduces handling time thereby making the handling of the containers more efficient and subsequently reducing costs. Because of the added section 150 of the grid guide track structure, it is preferred that the outer end portion of the section 150 be supported by concrete or steel columns 152 that are anchored within the berth area at a distance from the dock area so as to allow clearance for container ships within the berth. A Support beam 153 is supported by the columns 152 and is used to support extensions 154 of the section 150 of the grid guide track structure 60.

Figure 21:
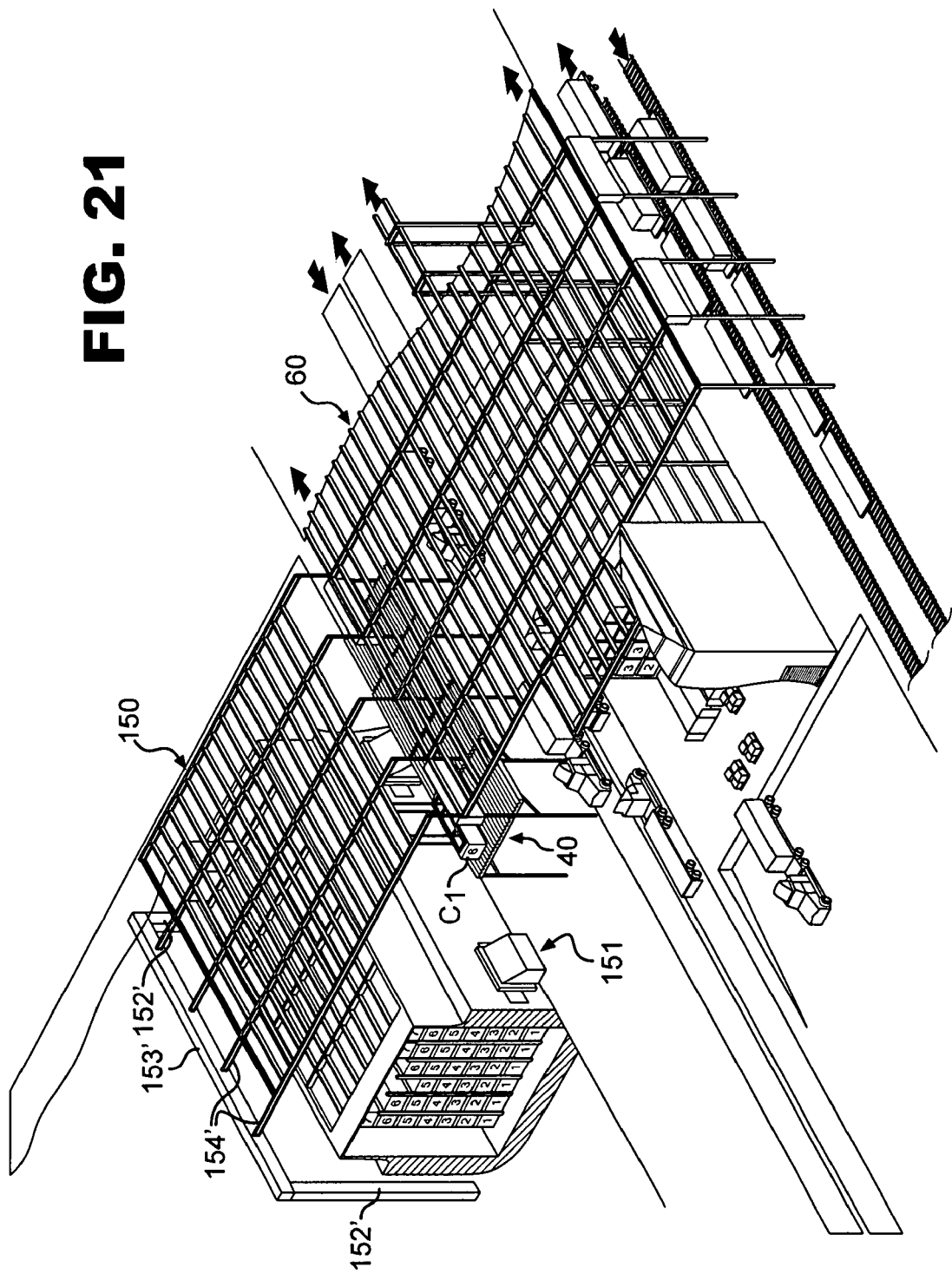
FIG. 21 is a variation of the grid guide track system shown in FIG. 10 wherein the track section above the ship berthing area is elevated relative to the remaining track section of the system.
Figure 22:
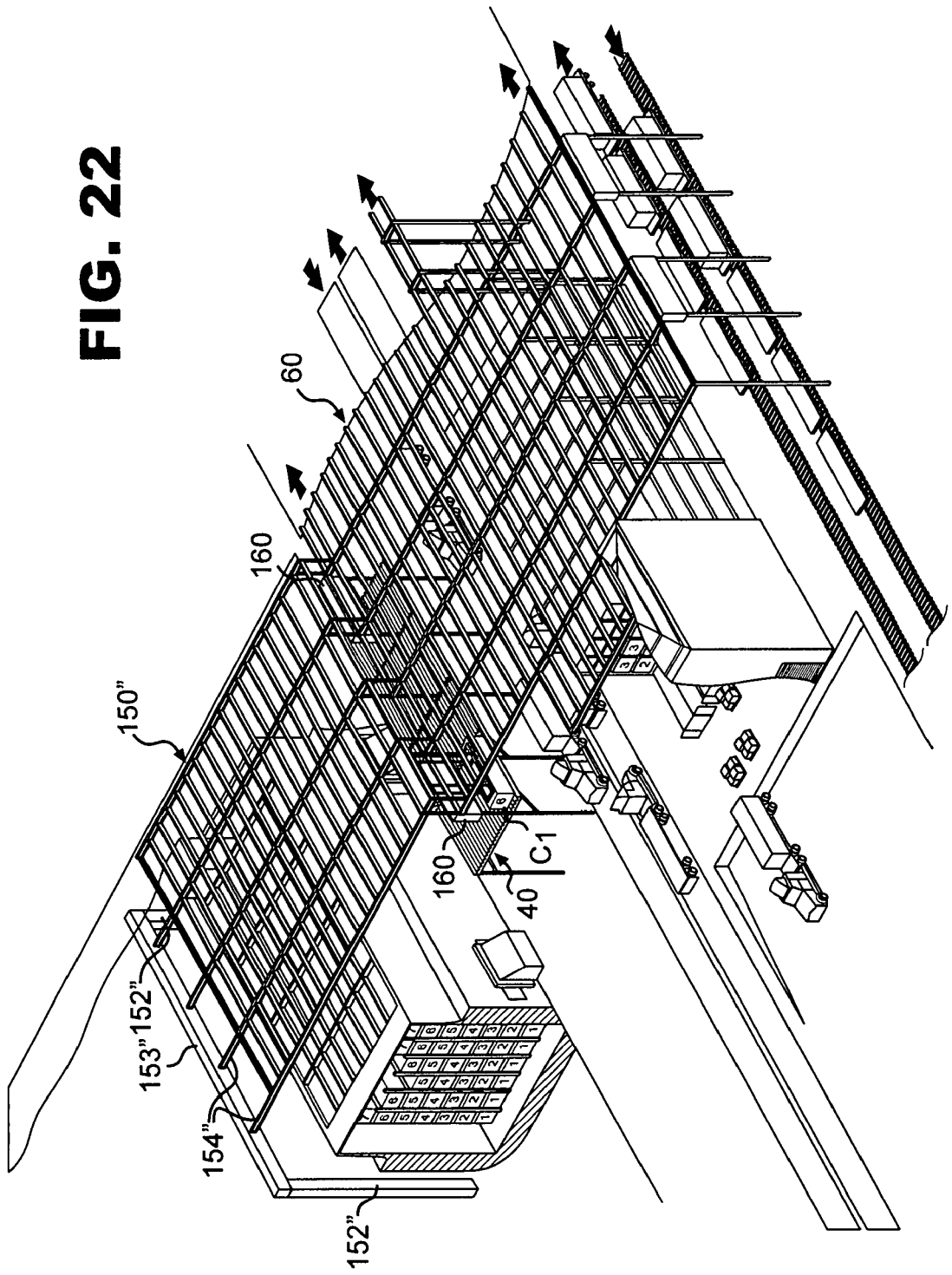
FIG. 22 is another variation of the grid guide track system shown in FIG. 10 wherein the track section above the ship berthing area is elevated relative to the remaining track section of the system and also extends above a portion of the lower remaining portion of the remaining track section.

Modifications of the grid guide track system shown in FIG. 10 are shown in FIGS. 21 and 22. In the modified system of FIG. 21, the portion 152' of the grid guide track that extends above the ship is elevated relative to the remaining portion of the grid guide track system. Such an elevated portion of the grid guide track is necessary to permit clearance of the system over larger ships. However, due to cost considerations, it is generally not practical to elevate the remaining portion of the track system to the same extent. The drawback is that separate transfer units must operate within the separate areas of the grid guide track system thus requiring transfer of the containers at the transfer platform 40. It should be noted that the transfer platform 40 extends beneath both the elevated section 150' and the remaining section 60 of the grid guide track system. To facilitate the transfer of the containers between the separate sections, the transfer platform may include rollers with the platform being tiltable toward the section to which the container is being transferred.

Because of the added section 150' of the grid guide track structure 60, it is preferred that the outer end portion of the section 150' be supported by concrete or steel columns 152' that are anchored within the berth area at a distance from the dock area so as to allow clearance for container ships within the berth. A Support beam 153' is supported by the columns 152' and is used to support extensions 154' of the section 150' of the grid guide track structure.

In the modification of the grid guide track system shown in FIG. 22, the elevated and extended section 150" of the system is shown as extending over a portion of the remaining section 60 of system such that containers are raised or lowered through the outermost grid openings 160 of the lower section of the system relative to the transfer platform 40. In this manner, it is not necessary to shift the containers horizontally on the platform to enable them to be engaged by the separate transfer units operating in both the elevated and remaining portion of the grid guide track system.

Again, due to the added section 150" of the grid guide track structure 60, it is preferred that the outer end portion of the section 150" be supported by concrete or steel columns 152" that are anchored within the berth area at a distance from the dock area so as to allow clearance for container ships within the berth. A Support beam 153" is supported by the columns 152" and is used to support extensions 154" of the section 150" of the grid guide track structure.

To further maintain ships within the berth stabilized in a horizontal plane to facilitate loading and unloading of shipping containers, automatic mooring devices 151 are used that will allow the ships to move vertically with the tides but prevent movement in the horizontal plane. Such devices use suction heads to engage the hull of the ships. One such mooring device is Manufactured by Mooring System, Ltd., of Christchurch, New Zealand, and known as MoorMaster™.

Using the systems of the invention, it is envisioned that ships can be loaded and unloaded simultaneously to reducing the time a ship must remain at dockside almost in half. Also, multiple (TUs) can pre-stage shipping containers in such a way they are positioned closest to their outbound area (truck, rail, ship) in predetermined order to expedite loading onto the particular mode of transportation (truck, rail, ship). The (TUs) can be off-lined in the event of breakdown, while the other (TUs) continue to transfer the shipping containers. Additionally, the storage area can be divided into an inbound area in the middle, which is empty initially, while the outbound containers are pre-staged to be worked from the inside out, towards the outside of each pre-stage area for truck, rail and ship movement.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

We claim:

1. A port material handling and storage system for storing and transporting shipping containers wherein the system is adapted for use for loading and off loading shipping containers relative to ships berthed adjacent a docking facility, the system comprising: an overhead grid guide track structure including a first portion positioned over at least one storage area wherein shipping containers may be vertically stacked one upon the other to thereby define a plurality of vertical storage cells and a second portion positioned over at least one ground transport area, said overhead grid guide track structure being made from a plurality of hollow beams connected together in an X-Y grid configuration, each hollow beam having a slot in the underside thereof, said hollow beams being connected to one another to form a plurality of first spaced and parallel tracks that extend in a first direction and a plurality of second spaced and parallel tracks that extend in a second direction substantially perpendicular to the first direction, said first and second tracks intersecting substantially perpendicularly with one another so that said slots in the undersides thereof form a plurality of open intersections that are spaced from one another to form the X-Y grid configuration of said overhead grid guide track structure, at least one transfer unit moveably mounted to said grid guide track structure so as to be suspended from at least two of said spaced and parallel first tracks when moving in the first direction and at least two of said spaced and parallel second tracks when moving in the second direction, said at least one transfer unit including carriage means for suspending said at least one transfer unit from said at least two first and second parallel tracks, said at least one transfer unit including selectively operable drive means for moving said at least one transfer unit along said tracks of said grid guide track structure so as to be moveable in a horizontal plane in X-Y motions along both the first direction and the second direction within the plane along and from or into said first and second portions of said grid guide track structure, a container engaging means suspended from a hoist means carried by said at least one transfer unit for raising and lowering said container engaging means, and said container engaging means being of a size to cooperatively engage a shipping container whereby an engaged shipping container may be conveyed to a selected location beneath the overhead grid guide track structure.

2. The port material handling and storage system of claim 1 wherein said grid guide track structure includes a third portion that extends vertically over a transfer area where shipping containers are placed when being transferred to and from a ship within a berth area and the at least one storage area or the at least one ground transport area.

3. The port material handling and storage system of claim 2 wherein said transfer area includes a transfer platform having at least a portion thereof oriented beneath said third portion of said grid guide track structure for receiving containers from said at least one transfer unit which is movable in X-Y motions in a horizontal plane above said portion of said transform platform oriented beneath said third portion, and at least one crane means for moving containers between said transfer platform and a ship in the berth area.

4. The port material handling and storage system of claim 3 including means for elevating said transfer platform above a ground surface.

5. The port material handling and storage system of claim 2 including at least one electronic container scanner mounted below said grid guide track structure and positioned such that a container carried by said at least one transfer unit may be selectively aligned with said at least one electronic container scanner in order to examine the contents of the container.

6. The port material handling and storage system of claim 2 including at least one electronic container scanner positioned between the berth and said first and second portions of said grid guide track structure.

7. The port material handling and storage system of claim 2 including at least one electronic container scanner positioned between said first and second portions of said grid guide track structure and the at least one ground transport area.

8. The port material and handling and storage system of claim 1 in which said drive means includes first track engaging members for engaging said at least two first parallel and spaced tracks and at least one first drive motor for driving said first track engaging members, and said drive means further including second track engaging members for engaging said at least two second parallel and spaced tracks and at least one second drive motor for driving said second track engaging members.

9. The automated material handling and storage system of claim 1 including at least one operator platform mounted to said at least one transfer unit, said operator platform including control means for controlling said drive means and said winch means for controlling movement of said at least one transfer unit and for controlling movement of said container engaging means.

10. The port material handling and storage system of claim 1 wherein said drive means includes at least one first drive motor for driving said at least one transfer unit in the first direction and at least one second drive motor for driving said at least one transfer unit in the second direction along said grid guide track structure.

11. The port material handling and storage system of claim 1 including a remotely readable identification tag associated with said at least one transfer unit and a central controller for monitoring movement of said at least one transfer unit within said grid guide track system.

12. The port material handling and storage system of claim 1 wherein said hoist means is mounted to a platform that is movably mounted to said at least one transfer unit whereby a position of a container relative to said at least one transfer unit may be changed.

13. The port material handling and storage system of claim 12 wherein said platform is movably mounted to said at least one transfer unit by a X-Y extension system.

14. A method for handling conventional shipping containers in a port relative to a ship, at least one ground based storage area and at least one ground transport shipping and receiving station, the method including the steps of:
  A. Providing a grid guide track structure above at least the at least one ground based storage area and the at least one ground transport shipping and receiving station, wherein the grid guide track structure is made from a plurality of hollow beams connected together in an X-Y grid configuration, each hollow beam having a slot in the underside thereof, the hollow beams being connected to one another to form a plurality of first spaced and parallel tracks that extend in a first direction and a plurality of second spaced and parallel tracks that extend in a second direction substantially perpendicular to the first direction, the first and second tracks intersecting substantially perpendicularly with one another so that the slots in the undersides thereof form a plurality of open intersections that are spaced from one another to form the X-Y grid configuration of the grid guide track structure;
  B. Providing at least one transfer unit which is moveable along the first and second tracks of the grid track structure in X-Y motions along both the first direction and the second direction with respect to a horizontal plane and which at least one transfer unit includes at least one hoist for raising and lowering a device for engaging a shipping container;
  C. Providing a transfer area and transferring shipping containers to and from a ship and the transfer area;
  D. Raising and lowering shipping containers from the transfer area using the at least one transfer unit and conveying the shipping containers along the grid guide track structure using the at least one transfer unit to and from one of the at least one ground based storage area, the at least one ground transport shipping area and the transfer area; and
  E. Lowering the shipping containers into either a container stacking area of the at least one ground based storage area or onto a transport vehicle in the at least one ground transport shipping area or a stacking area of the ship.

15. The method of claim 14 wherein when the shipping containers are lowered into the container stacking area or the ship, the additional step of:
  F. Stacking the shipping containers in vertical cells with the containers being in side-by-side and in end-to-end relationship and primarily without intermediate isles there between.

16. The method of claim 14 including the additional step of:
  Conveying at least one of the shipping containers movably carried by the at least one transfer unit to a container scanner device; and
  Scanning the at least one shipping container to determine the contents thereof.

* * * * *